US007930099B2

(12) United States Patent
Iwahori

(10) Patent No.: US 7,930,099 B2
(45) Date of Patent: Apr. 19, 2011

(54) MAP DISTRIBUTING DEVICE, MAP ACQUIRING DEVICE, MAP PROCESSING SYSTEM, MAP DISTRIBUTING METHOD, MAP ACQUIRING METHOD, MAP PROCESSING PROGRAM AND RECORDING MEDIUM STORING THE MAP PROCESSING PROGRAM

(75) Inventor: Yasufumi Iwahori, Tokyo (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 1099 days.

(21) Appl. No.: 11/332,850

(22) Filed: Jan. 17, 2006

(65) Prior Publication Data

US 2006/0173613 A1    Aug. 3, 2006

(30) Foreign Application Priority Data

Jan. 18, 2005    (JP) .................................. 2005-010943

(51) Int. Cl.
*G01C 21/32* (2006.01)
(52) U.S. Cl. ..................................... 701/208; 340/995.1
(58) Field of Classification Search .................. 701/208; 340/995.1
See application file for complete search history.

(56) References Cited

U.S. PATENT DOCUMENTS

| | | | | |
|---|---|---|---|---|
| 5,848,373 A * | 12/1998 | DeLorme et al. | ............. | 701/200 |
| 6,038,559 A * | 3/2000 | Ashby et al. | ...................... | 707/4 |
| 6,343,301 B1 * | 1/2002 | Halt et al. | ..................... | 707/203 |
| 6,546,334 B1 * | 4/2003 | Fukuchi et al. | ............... | 701/208 |
| 6,845,322 B1 * | 1/2005 | Chao et al. | ..................... | 701/209 |
| 7,079,946 B2 * | 7/2006 | Hunzinger | ..................... | 701/208 |
| 2003/0220735 A1 * | 11/2003 | Nimura | .......................... | 701/208 |
| 2004/0024973 A1 * | 2/2004 | Chron et al. | ................... | 711/144 |
| 2004/0085227 A1 * | 5/2004 | Mikuriya et al. | ......... | 340/995.14 |
| 2004/0111213 A1 * | 6/2004 | Iwamura et al. | .............. | 701/208 |
| 2005/0085994 A1 * | 4/2005 | Kimura | .......................... | 701/208 |
| 2005/0114016 A1 * | 5/2005 | Kim et al. | ..................... | 701/208 |

(Continued)

FOREIGN PATENT DOCUMENTS

EP    1 464 922 A1    10/2004

(Continued)

OTHER PUBLICATIONS

European Search Report dated May 15, 2006.

(Continued)

*Primary Examiner* — Khoi Tran
*Assistant Examiner* — Kyung J Kim
(74) *Attorney, Agent, or Firm* — Kratz, Quintos & Hanson, LLP

(57) ABSTRACT

The map updating system (100) includes a server unit (400) and a terminal unit (300, 300A, 300B). The server unit (400) has an updated contents recognizer that recognizes updated contents of updated map information and generates updated contents information, a user recognizer that recognizes distribution request information and also recognizes user information containing the distribution request information when determining that the updated contents information contains request contents of the distribution request information, and an information transmitter that transmits the updated map information to the terminal unit (300, 300A, 300B) corresponding to the user information such that the map information can partially be rewritten with a part of the updated map information. The terminal unit (300, 300A, 300B) includes a terminal map updating section that acquires the transmitted updated map information and stores the part of the updated map information in a terminal storage section in a rewritable manner.

19 Claims, 11 Drawing Sheets

U.S. PATENT DOCUMENTS

2006/0041556 A1* 2/2006 Taniguchi et al. .............. 707/10
2007/0246483 A1* 10/2007 Boudy et al. ................ 222/145.3

FOREIGN PATENT DOCUMENTS

| JP | 2001-141473 | 5/2001 |
| JP | 2002-188926 | 7/2002 |
| JP | 2002-188927 | 7/2002 |
| JP | 2002-312521 | 10/2002 |
| JP | 2003-232647 | 8/2003 |
| JP | 2004-309705 | 11/2004 |
| JP | 2004-354149 | 12/2004 |

OTHER PUBLICATIONS

Office Action issued in corresponding Japanese patent application No. 2005-010943 dated Jan. 11, 2011 with English translation.

* cited by examiner

FIG.8

| | | 21 | | |
|---|---|---|---|---|
| 22 | UPDATED DATE INFORMATION | 2004-12.13 | 2004-12.21 | ... |
| 23 | UPDATED VERSION INFORMATION | 2.91 | 2.93 | ... |
| 24 | UPDATED CONTENTS INFORMATION | TOKYO SAITAMA CHIBA | SHINJUKU -CONVENIENCE STORE SUGINAMI -CONVENIENCE STORE | ... |
| 25 | SUBJECT MAP INFORMATION | KANTO,TOKYO SAITAMA,CHIBA | TOKYO | |

20

MAP DISTRIBUTING DEVICE, MAP ACQUIRING DEVICE, MAP PROCESSING SYSTEM, MAP DISTRIBUTING METHOD, MAP ACQUIRING METHOD, MAP PROCESSING PROGRAM AND RECORDING MEDIUM STORING THE MAP PROCESSING PROGRAM

BACKGROUND OF THE INVENTION

1. Field of the Invention

The present invention relates to a map distributing device, a map acquiring device, a map processing system, a map distributing method, a map acquiring method, a map processing program, and a recording medium storing the map processing program, each updating map information related to a map.

2. Description of Related Art

Conventionally, there has been known a navigation device that updates old map information to new map information (e.g., see Document 1: JP-A-2001-141473, pages 3 to 4, FIGS. 2 and 5).

The device disclosed in Document 1 allows a usage period calculator to specify a creation period of map data to calculate a usage period up to the present from the creation period. Then the device allows an expression changer to change an expression according to the usage period, namely, the longer the usage period of the map is, the more unclearly the device allows a display section to display, so that a user may find that the map has been old.

Incidentally, the conventional configuration in Document 1 processes for changing the expression of map information displayed on the display section according to how old the map is. However, according to the configuration, the user can recognize that the map has been old, but can not recognize information related to updated contents of the new map. And, when updating the map, the user generally needs to purchase new map information via a network or a recording medium. Therefore, the user can check the updated contents of the new map information only after the purchase of the new map information. Thus, even though the user purchases the new map information, the user may not acquire desired map information.

SUMMARY OF THE INVENTION

An object of the present invention is to provide a map distributing device, a map acquiring device, a map processing system, a map distributing method, a map acquiring method, a map processing program, and a recording medium storing the map processing program, each acquiring proper map information.

A map distributing device according to an aspect of the invention includes: a map recognizer that recognizes map information and updated map information related to updated contents of the map information; a map update request acquirer that acquires map update request information for requesting distribution of predetermined updated contents of the map information from a map acquiring device for storing the map information; and a map distributor that compares the updated map information with the map update request information, and distributes the updated map information corresponding to contents requested in the map update request information to the map acquiring device such that the map information stored in the map acquiring device can be rewritten.

A map acquiring device according to another aspect of the invention includes: a storage section that stores map information; a map update request information generator that generates map update request information for requesting distribution of predetermined updated contents of the map information; a map acquirer that transmits the map update request information to a map distributing device for distributing updated map information related to updated contents of the map information, and acquires the updated map information having the updated contents corresponding to the contents of the map update request information from the map distributing device; and a map storing processor that rewrites the map information with the updated map information and stores the updated map information.

A map processing system according to still another aspect of the invention includes: the above-described map distributing device; and a map acquiring device including: a map acquirer connected to the map distributing device via a network and acquiring the updated map information distributed from the map distributing device; and a storage section for storing the map information, rewriting the map information with the updated map information distributed from the map distributing device and stores the updated map information.

A map processing system according to yet another aspect of the invention includes: the above-described map acquiring device according; and a map distributing device connected to the map acquiring device via a network and receiving the map update request information from the map acquiring device to distribute the updated map information corresponding to the map update request information.

A map processing system according to a further aspect of the invention includes: the above-described map distributing device; and the above-described map acquiring device, the map acquiring device being connected to the map distributing device via a network.

A map distributing method according to still a further aspect of the invention includes the steps of: storing map information; generating map update request information for requesting distribution of predetermined updated contents of the map information; transmitting the map update request information to a map distributing device that distributes updated map information related to updated contents of the map information, and acquiring the updated map information having the updated contents corresponding to the contents of the map update request information from the map distributing device; and rewriting the map information with the updated map information and stores the updated map information.

A map acquiring method according to yet a further aspect of the invention includes the steps of: storing map information in a storage section; recognizing map update request information for requesting distribution of predetermined updated contents of the map information; acquiring the updated map information having updated contents corresponding to the contents of the map update request information from the map distributing device that distributes the updated map information related to updated contents of the map information; and rewriting the map information stored in the storage section with the updated map information and stores the updated map information.

A map processing program according to yet a further aspect of the invention allows a computing unit to function as the above-described map distributing device and the above-described map acquiring device.

A map processing program according to yet a further aspect of the invention allows a computer unit to perform the above-described map distributing method or the above-described map acquiring method.

A recording medium according to yet a further aspect of the invention stores the above-described map processing program in a manner readable by a computing unit.

BRIEF DESCRIPTION OF THE DRAWINGS

FIG. 8 is a conceptual diagram schematically showing a map update history database storing map update history information;

DETAILED DESCRIPTION OF PREFERRED EMBODIMENTS

[Configuration of Map Updating System]
Now, an embodiment of the present invention will be described below with reference to the attached drawings. The present embodiment explains a map updating system as a map processing system of the present invention, which updates map information stored in each terminal unit as a map acquiring device, based on drawings. The terminal unit utilized for the map processing system of the present invention may be an in-vehicle navigation device mounted on a vehicle, a portable navigation device, a PDA (Personal Digital Assistant), a mobile phone, a PHS (Personal Handyphone System) or a personal computer.

Figure 1:
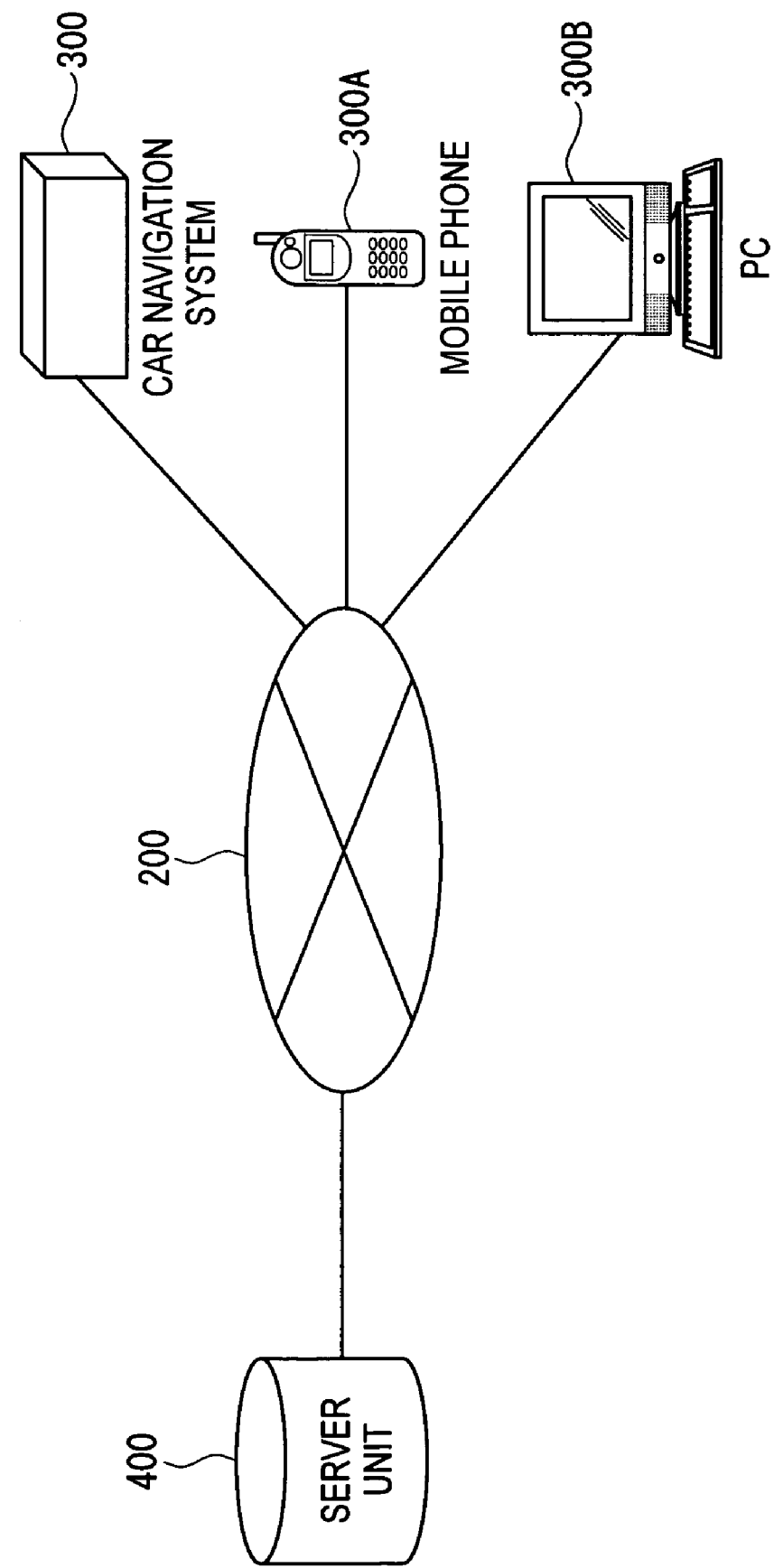
FIG. 1 is a block diagram showing the brief configuration of a map updating system according to an embodiment of the present invention.
Figure 2:
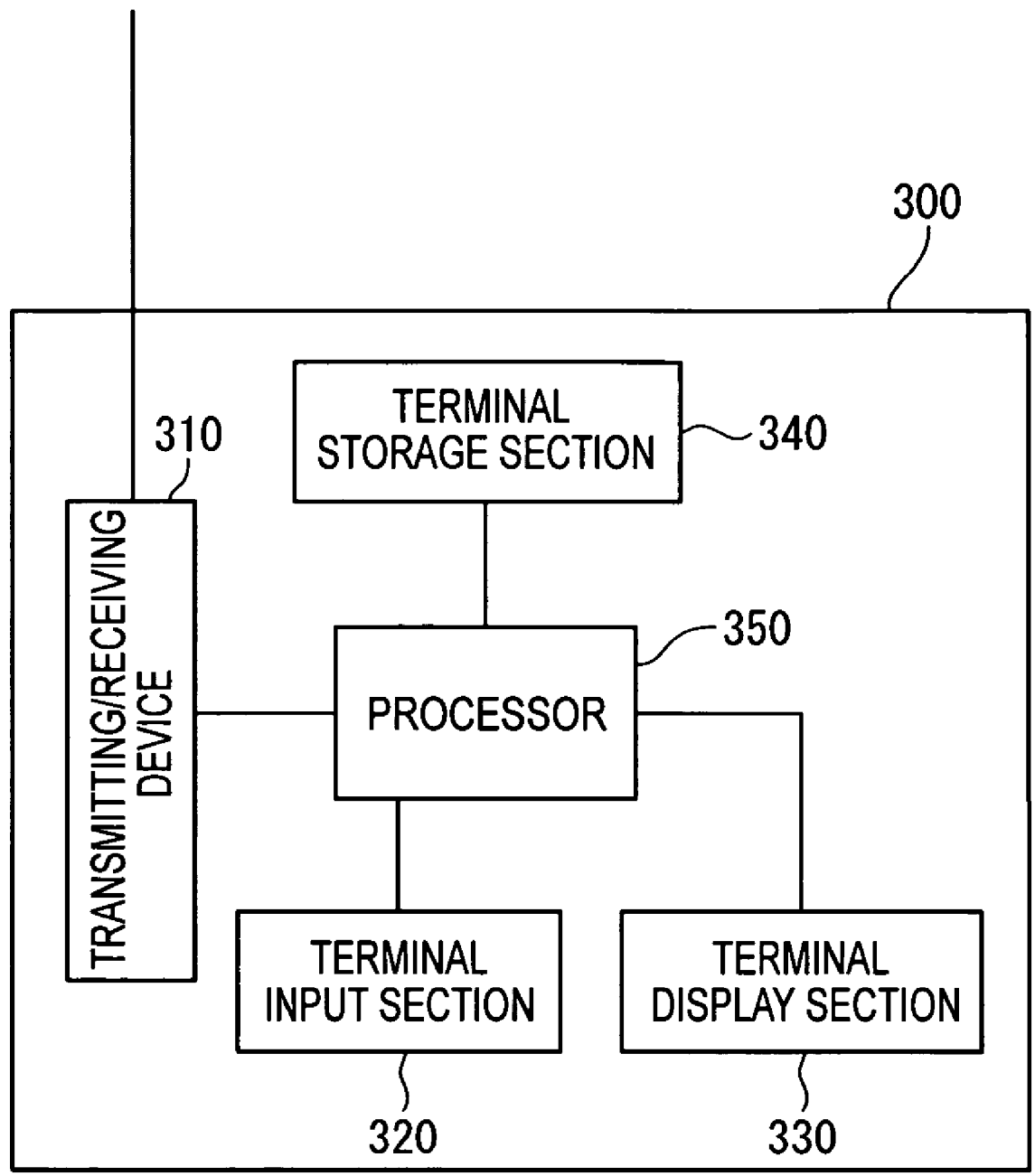
FIG. 2 is a block diagram showing the brief configuration of a terminal unit.
Figure 3:
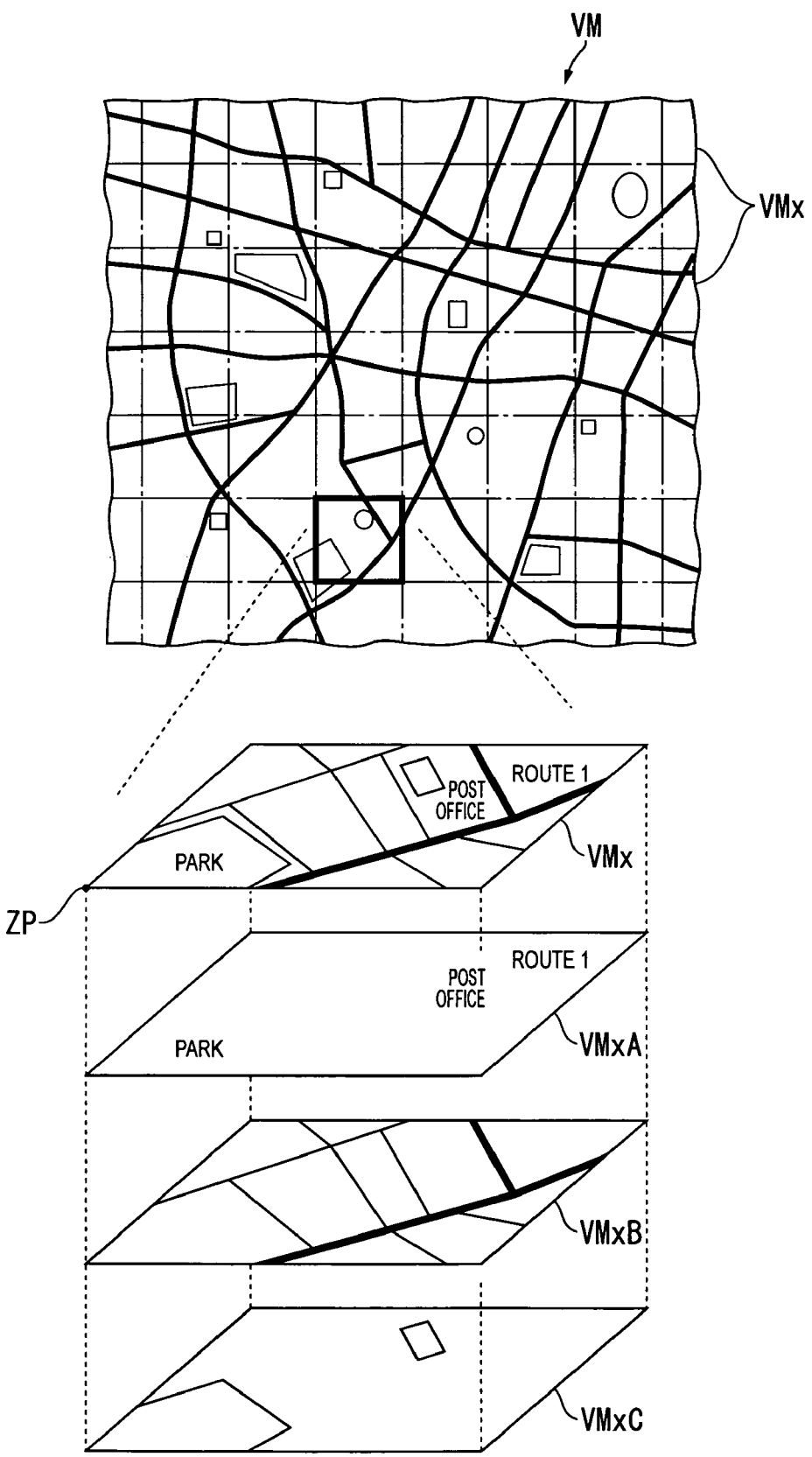
FIG. 3 is a conceptual diagram schematically showing a table structure for display data of map information.
Figure 4:
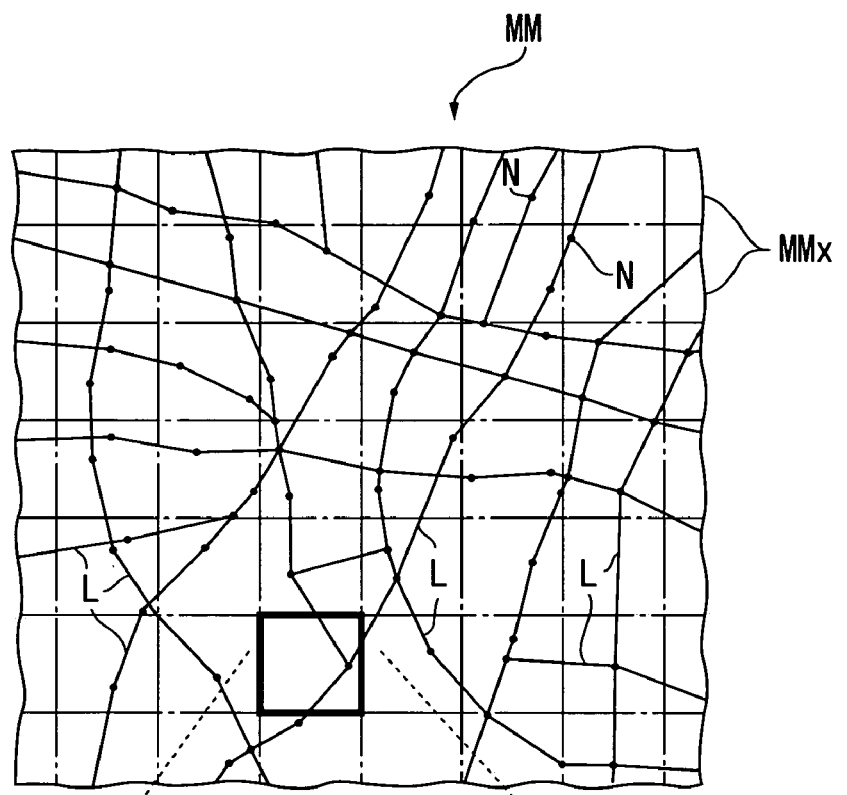
FIG. 4 is a conceptual diagram schematically showing a table structure for matching data of the map information.
Figure 4:
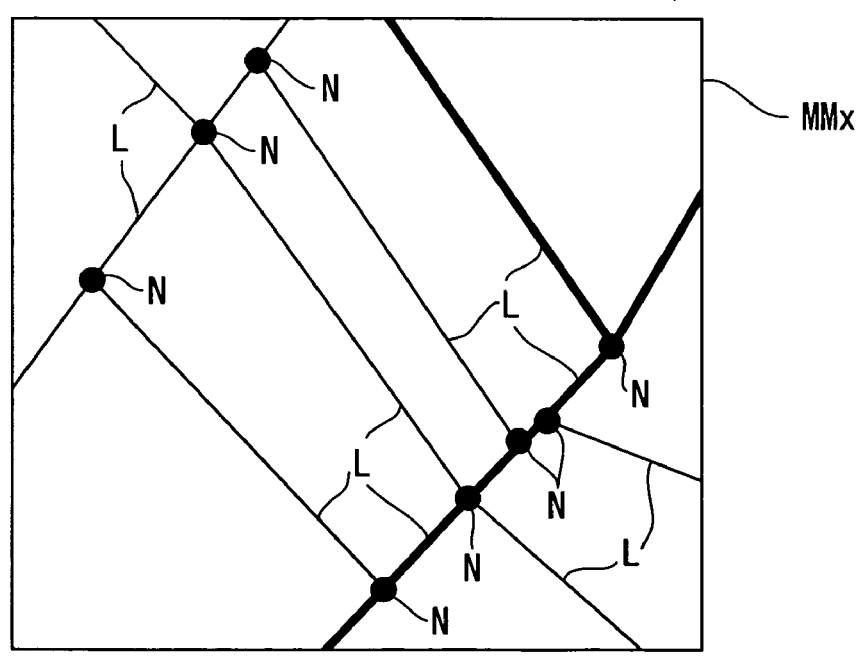
Figure 5:
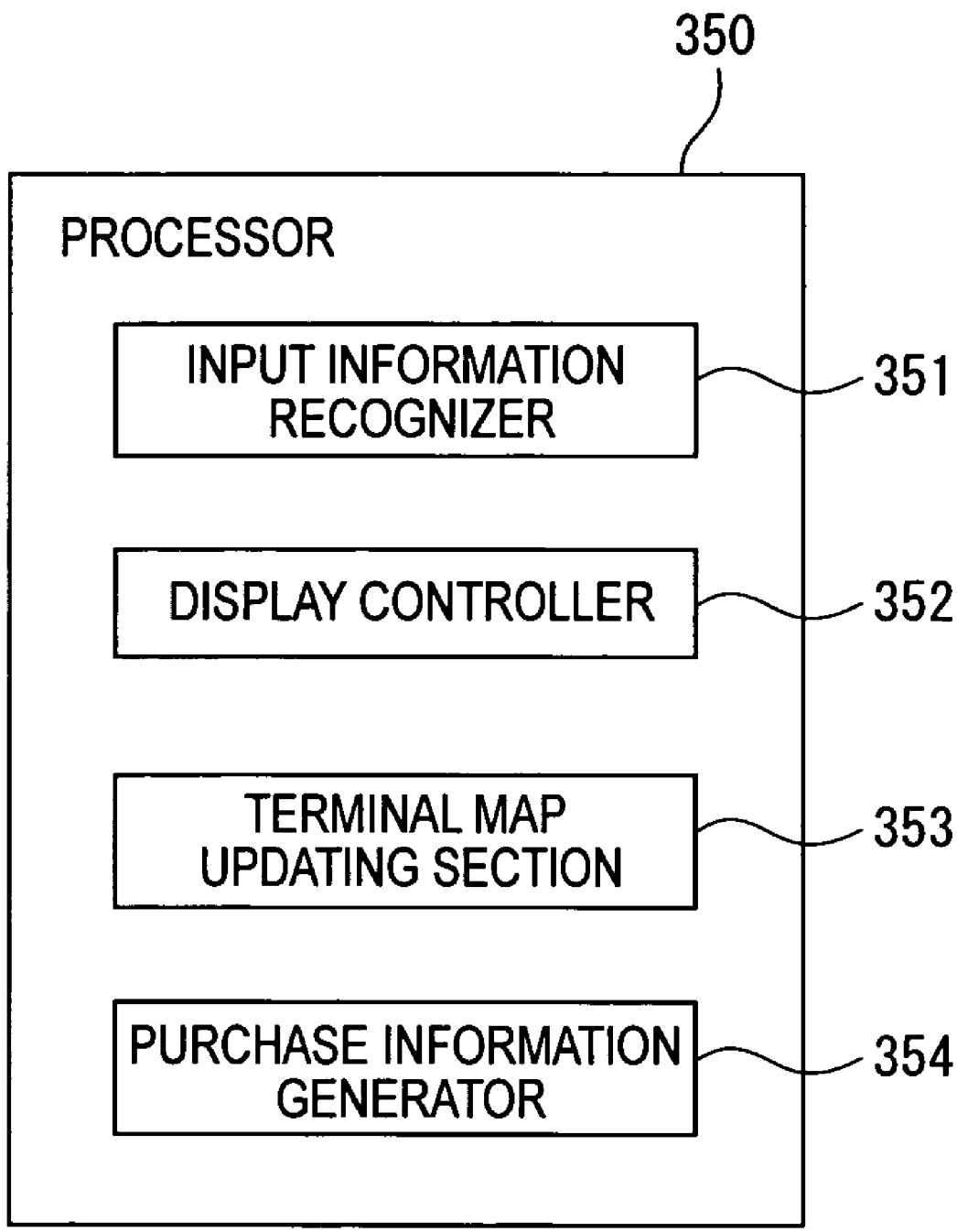
FIG. 5 is a block diagram showing the brief configuration of a processor of the terminal unit.
Figure 6:
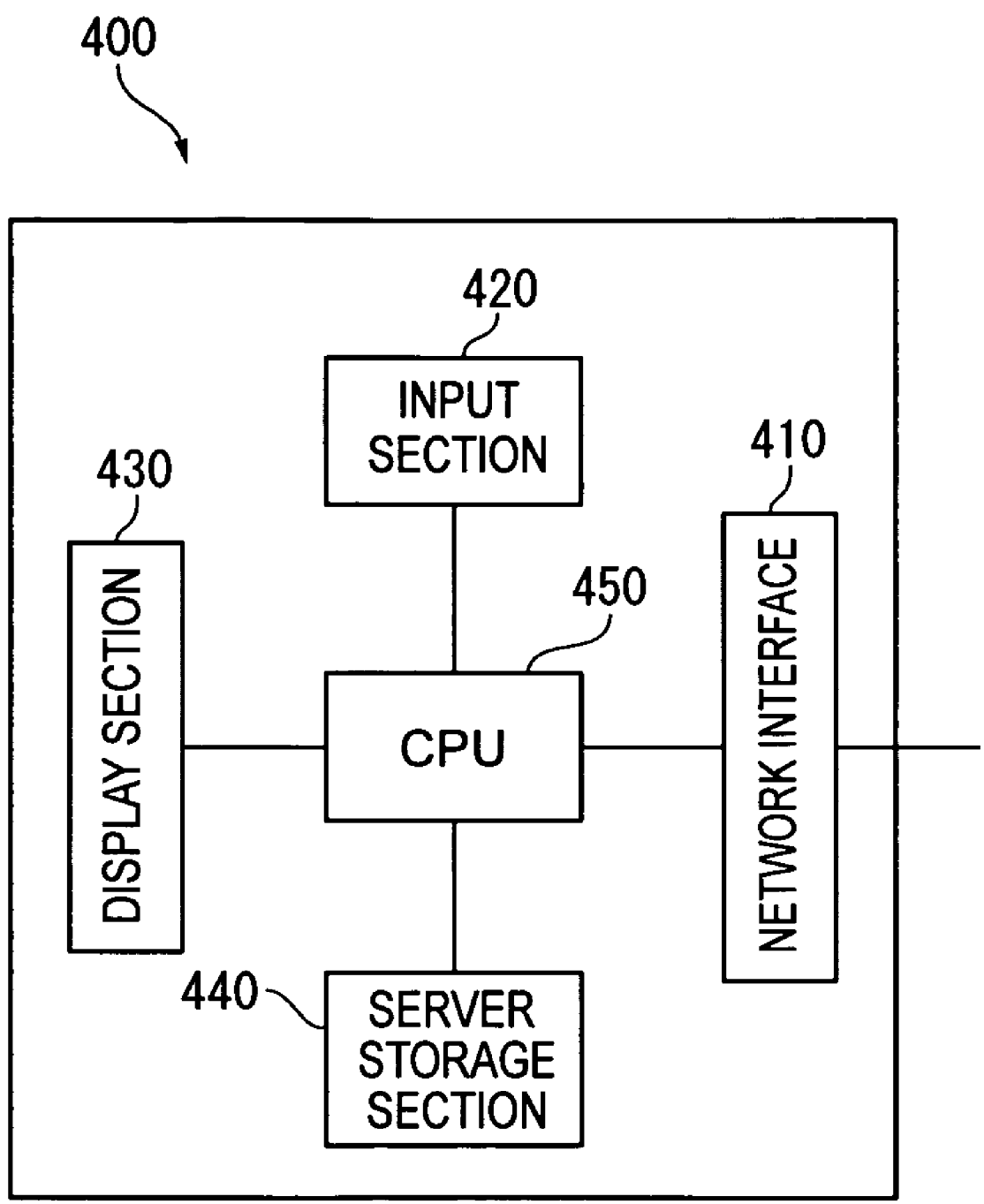
FIG. 6 is a block diagram showing the brief configuration of a server unit.
Figure 7:
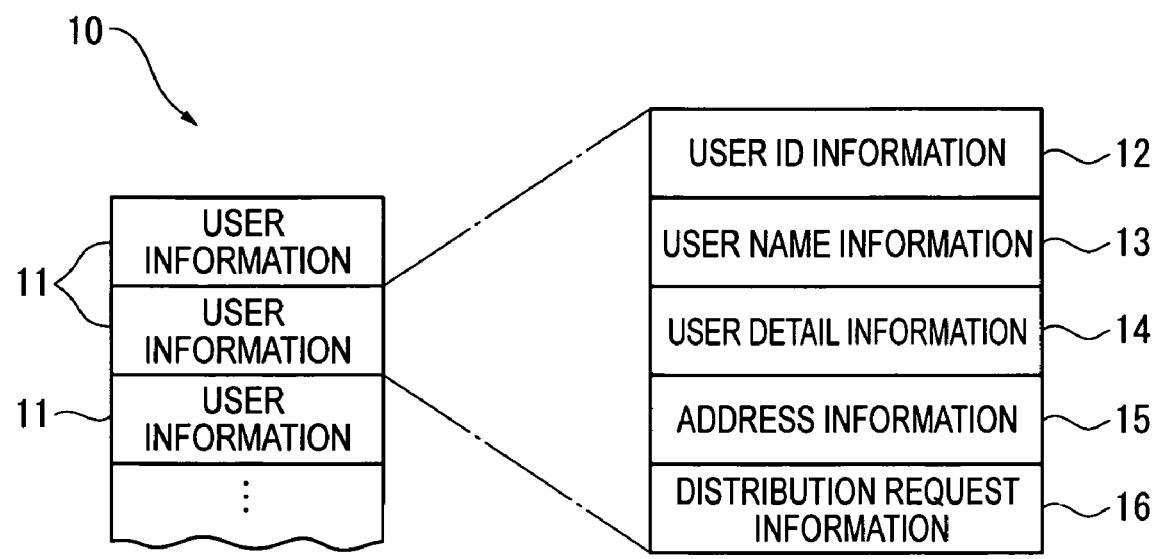
FIG. 7 is a conceptual diagram schematically showing a user information database storing user information.
Figure 9:
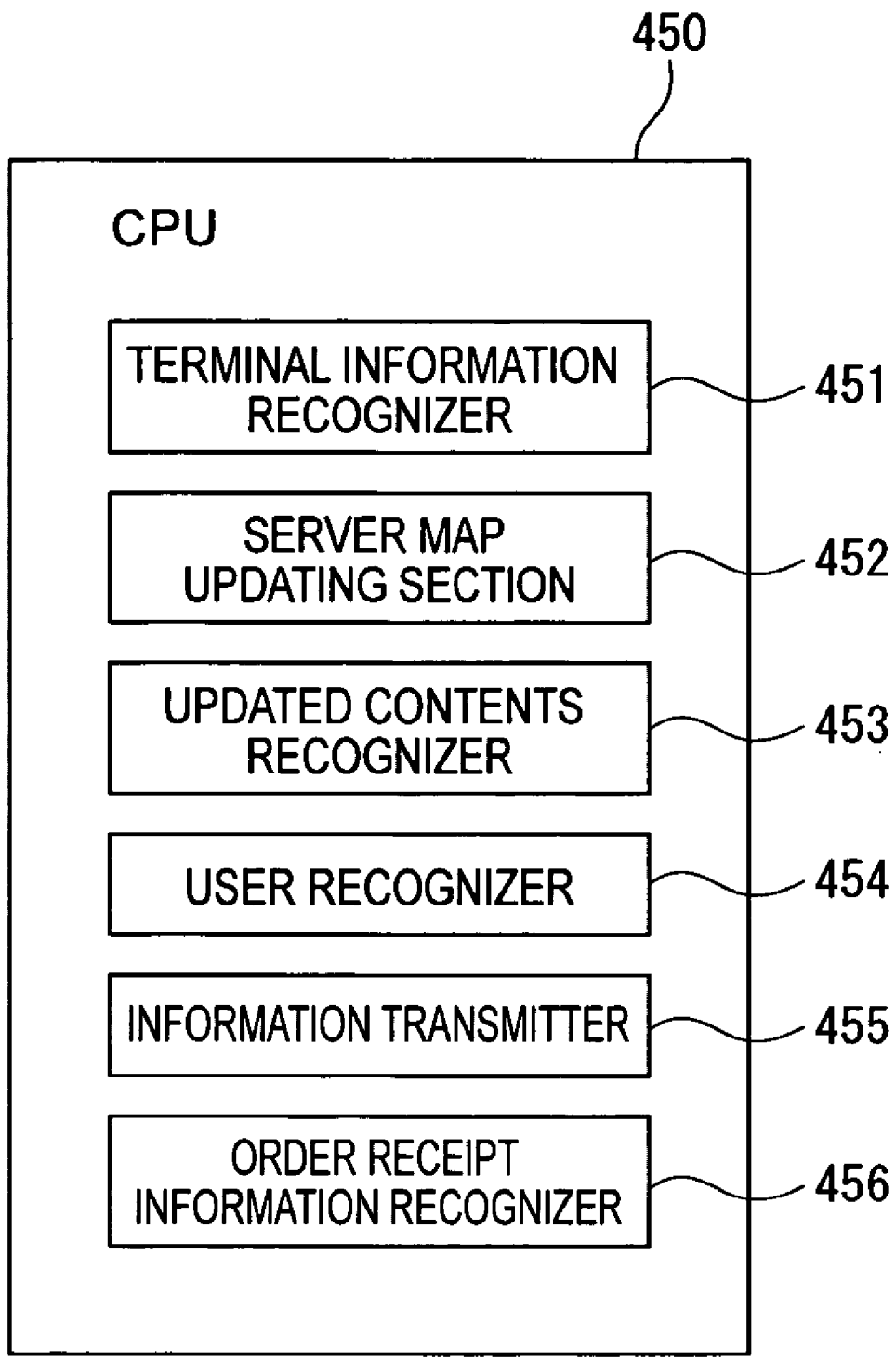
FIG. 9 is a block diagram showing the brief configuration of a CPU of the server unit.

FIG. 1 is a block diagram showing the brief configuration of the map updating system according to the present embodiment of the present invention. FIG. 2 is a block diagram showing the brief configuration of the terminal unit. FIG. 3 is a conceptual diagram schematically showing a table structure for display data of the map information. FIG. 4 is a conceptual diagram schematically showing a table structure for matching data of the map information. FIG. 5 is a block diagram showing the brief configuration of a processor of the terminal unit. FIG. 6 is a block diagram showing the brief configuration of a server unit. FIG. 7 is a conceptual diagram schematically showing a user information database storing user information. FIG. 8 is a conceptual diagram schematically showing a map update history database storing map update history information. FIG. 9 is a block diagram showing the brief configuration of a CPU of the server unit.

In FIG. 1, 100 represents a map updating system as a map processing system, the map updating system 100 including a network 200, a terminal unit 300, 300A, 300B, and a server unit 400 as a map distributing device. The map updating system 100 updates information related to a map stored in the terminal unit 300, 300A, 300B. The terminal unit 300, 300A, 300B may employ an in-vehicle navigation device, a portable navigation device, a PDA (Personal Digital Assistant), a mobile phone, a PHS (Personal Handyphone System) or a personal computer, as mentioned above. Hereinafter, the terminal unit 300 is defined as the in-vehicle navigation device as an example.

The terminal unit 300 acquires map information distributed by the server unit 400, e.g., as a map processing device via the network 200. On the basis of the map information, the terminal unit 300 searches and displays information related to a current position and a destination, a route to the destination, a predetermined shop nearby, and information related to service offered by the shop. As shown in FIG. 2, the terminal unit 300 includes a transmitting/receiving device 310 as a receiver, a terminal input section 320, a terminal display section 330 as a display section, a terminal storage section 340 as a storage section, and a processor 350 also functioning as a computing unit.

The transmitting/receiving device 310 connects to the server unit 400 via the network 200, and to the processor 350. The transmitting/receiving device 310 can receive a predetermined terminal signal from the server unit 400 via the network 200. Upon acquisition of the terminal signal, the transmitting/receiving device 310 performs a preset input interface processing and outputs the terminal signal as a processing terminal signal to the processor 350. The transmitting/receiving device 310 can also receive a predetermined processing terminal signal from the processor 350. Upon acquisition of the processing terminal signal, the transmitting/receiving device 310 performs a preset output interface processing and transmits the processing terminal signal as a terminal signal to the server unit 400 via the network 200.

The terminal input section 320 may be a keyboard, a mouse or the like, having various operation buttons and operation knobs (both not shown) for input operation. The operation buttons and the operation knobs are used for input operations to input, for example, setting items for setting the operation contents of the terminal unit 300. To be more specific, the setting items include setting of conditions for acquiring the map information, setting of information about contents to be transmitted to the server unit 400, setting of the destination, retrieval of information, and request for displaying the map information. When the setting items are input, the terminal input section 320 outputs a predetermined operation signal to the processor 350 to apply the settings. Incidentally, the terminal input section 320 may apply to any types of input units such as a touch panel arranged on the terminal display section 330 and a sound input section for the input operation, instead of operation buttons and the operation knobs, as long as various setting items can be set.

The terminal display section 330, under the control of the processor 350, displays image data output from the processor 350. The image data may be TV image data received by a TV receiver (not shown), image data stored in an external device or recording medium such as an optical disc, a magnetic disk or a memory card and read by a drive or a driver, image data from the terminal storage section 340, and image data received by the server unit 400, in addition to image data such as the route select information, the map information and the retrieval information. The terminal display section 330 may typically be a liquid crystal panel, an organic EL (Electro Luminescence) panel, a PDP (Plasma Display Panel), or a CRT (Cathode-Ray Tube).

The terminal storage section 340, for example, readably stores the map information etc. as shown in FIGS. 3 and 4. The terminal storage section 340 has a map information storage area etc. (not shown) for storing the map information. The terminal storage section 340 exemplarily has the map information storage area, however, the terminal storage section 340 may not have the storage area, or may have an additional storage area. In addition, the terminal storage section 340 may include a drive or a driver for readably storing data on a recording medium such as a HD (Hard Disk), a DVD (Digital Versatile Disc), an optical disc and a memory card.

The map information includes plural pieces of locality map information constituted by display data VM, i.e., so-called POI (Point Of Interest) data as shown in FIG. 3, matching data MM as shown in FIG. 4, travel route search map data, etc. For instance, the locality map information respectively relates to maps for predetermined localities, like locality map information of a map for Kanto, that for Kansai, that for Tokyo, etc. Each piece of locality map information has version information indicating a revision state of each map.

The display data VM includes, for example, plural pieces of display mesh information VMx, each having a unique number. To be more specific, the display data VM is divided into plural pieces of display mesh information VMx, each relating to a certain area. The display data VM is constituted from the plural pieces of display mesh information VMx continuously arranged in a matrix form. The display mesh information VMx may be further divided into plural pieces of display mesh information VMx belonging to a lower layer, each relating to a certain area. The display mesh information VMx has a rectangular shape with each side thereof having a predetermined length, which is reduced relative to the actual geographic length according to the map scale. A predetermined corner thereof has absolute coordinate ZP in the whole map information, e.g., a global map.

The display mesh information VMx is, for instance, constituted from name information VMxA such as intersection names, road information VMxB and background information VMxC. The name information VMxA is data structured in a table for arranging and displaying miscellaneous element data (e.g. intersection name, town name) contained in the certain area at a predetermined position with reference to the positional relationship based on the absolute coordinate ZP. The road information VMxB is data structured in a table for arranging and displaying road element data (e.g. road) contained in the certain area at a predetermined position with reference to the positional relationship based on the absolute coordinate ZP. The background information VMxC is data structured in a table for arranging and displaying miscellaneous element data (e.g. mark and image information representing famous spots and buildings) at a predetermined position with reference to the positional relationship based on the absolute coordinate ZP.

The matching data MM, just like the display data VM, is divided into plural pieces of matching mesh information MMx, each having a unique number and relating to a certain area. The matching data MM is constituted from the plurality of matching mesh information MMx continuously arranged in a matrix form. The matching mesh information MMx may be further divided into a plurality of matching mesh information MMx to be contained in a lower layer, each relating to a certain area. The matching mesh information MMx has a rectangular shape with each side thereof having a predetermined length, which is reduced relative to the actual geographic length according to the map scale. A predetermined corner thereof has absolute coordinate ZP in the whole map information, e.g., a global map. The matching mesh information MMx and the display mesh information VMx may not necessarily represent the same area. That is, they may be divided according to different scales. If the same scale is used, the unique number information may be used for associating the data. If different scales are used, the absolute coordinate may be used for associating the data.

The matching data MM is used for the map matching processing for correcting the displayed information to locate a mark representing the vehicle on a road, when the traveling condition of the vehicle is superimposed on the map information. This processing prevents such errors that the mark representing the vehicle is displayed on a building instead of the road. The matching data MM has a plurality of link string block information.

As shown in FIG. 4, the link string block information is data structured in a table so that a plurality of links L are mutually associated according to a predetermined rule. The link L as a route element represents a road and connects nodes N as point information. Specifically, the links L each corresponding to a predetermined segment of a road are mutually connected like a line as a link string, which represents a continuous road such as Koshu street and Ome street. And the link L has a unique number assigned to each link L.

Each node N represents a joint point such as an intersection, a corner, a fork, a junction or the like of each road. The node N is also arranged on the center of a curved link L. The node N has a node ID which is a unique number assigned to each node N in the link string block information.

The terminal storage section 340 stores user input information related to a user of the terminal unit 300. The user input information is data, for example, associated with user name information, user detail information, address information, request map information as map update request information, etc.

The user name information relates to a name of the user. The name stored as the user name information may be a legal name of the user, or a temporal handle name.

The user detail information relates to details of the user, for instance, an address, a phone number, a gender of the user. The user detail information may be set as needed, i.e., may not include the address of the user. And, the user detail information may include password information related to passwords, for instance, the one for using the terminal unit 300, the one for browsing predetermined information, the one for performing a predetermined function, etc.

The address information specify, for instance, the terminal unit 300 required for transmitting/receiving information with the server unit 400. The address information may be IP address, e-mail address, etc. The address information is also applied to specify other terminal unit when the terminal unit 300 communicates with other terminal unit.

The request map information relates to contents of a map desired by the user, as a map to be stored in the terminal storage section 340. The request map information, for instance, contains category information as facility type information related to a category of a predetermined facility such as a facility that the user often uses or is interested in, locality information related to a locality where the user lives, works, or is interested in, road information related to a road that the user often passes or is interested in, etc. The category information, the locality information, and the road information are stored as needed by inputting/setting of the user, or setting of a manufacturer or an administrator according to user registration information. For example, only the category information may be stored without the locality information and the road information, or, all the category information, the locality information and the road information may be stored. And, the category information, the locality information and the road information may respectively store plural pieces of information. For instance, the category information may store categories related to a plurality of facilities such as "a convenience store", "an amusement park", etc.

The terminal storage section 340 also stores unique information for specifying the terminal unit 300. The unique information may be ID number information etc. assigned when the terminal unit is manufactured. Or, the address information of the user input information might alternatively be used for specifying the terminal unit 300.

The terminal storage section 340 readably stores the setting items input through the terminal input section 320, music data, image data and the like. The terminal storage section 340 also stores various programs that run on the OS (Operating System) controlling the whole operation of the terminal unit 300.

The processor 350 has various input/output ports (not shown) including a transmitting/receiving port connected to the transmitting/receiving device 310, a key input port connected to the terminal input section 320, a display control port connected to the terminal display section 330, a storage port connected to the terminal storage section 340, etc. As shown in FIG. 5, the processor 350 includes as various programs an input information recognizer 351 as a map update request information generator, a display controller 352, a terminal map updating section 353 also functioning as a map acquirer and a map storing processor, a purchase information generator 354, etc. The processor 350 may include other programs, such as the one for recognizing the current position of the vehicle, the one for recognizing the destination, and the one for setting a travel route from the current position to the destination.

The input information recognizer 351 recognizes the user input information upon inputting/setting based on the input operation of the user. To be more specific, the input information recognizer 351 recognizes the user name information, the user detail information, the address information and the request map information upon the inputting/setting of the user. Then, the input information recognizer 351 generates the user input information by associating the user name information, the user detail information, the address information and the request map information with each other, and readably stores the user input information in the terminal storage section 340.

The display controller 352 reads the map information stored in the terminal storage section 340 and controls the terminal display section 330 to display the map information when recognizing the information related to the request for displaying the map information upon the inputting/setting of the user. Then, the display controller 352 controls the terminal display section 330 to display and notify notice information related to updated contents of the map information received from the server unit 400. Further, the display controller 352 controls the terminal display section 330 to display the map information received from the server unit 400. Incidentally, the notice information is received from the server unit 400 by e-mail etc., and when recognizing the inputting/setting for displaying the e-mail with the received notice information attached upon the input operation of the user, the display controller 352 controls the terminal display section 330 to display the notice information.

The display controller 352 controls the terminal display section 330 to display updated locality map information of the map information newly acquired, and updated contents of the locality map information with an expression different from that of other not-updated map. For example, when the updated contents of the acquired map information is "a convenience store" of "Tokyo", the terminal display section 330 displays a sign "new" in the vicinity of "the convenience store" of "Tokyo". It should be noted that the expression of the updated contents might be other expression as long as the expression allows the updated contents to be distinguished from the not-updated map easily.

The terminal map updating section 353 allows the transmitting/receiving device 310 to receive the map information and demo version map information as restricted map information transmitted via the network 200 and acquires the information. Or, the terminal map updating section 353 acquires the map information stored in a recording medium such as a CD (Compact Disc) or a DVD (Digital Versatile Disc) using a drive (not shown). Hereinafter, the acquired map information is called updated map information to be distinguished from the existing map information stored in the terminal storage section 340. And, when recognizing the request information for updating the map by the inputting/setting of the user, or setting of the manufacturer or the administrator according to user registration information, the terminal map updating section 353 updates the map information stored in the map information storage area of the terminal storage section 340 to the updated map information. More specifically, the terminal map updating section 353 recognizes the updated contents of the updated map information relative to the existing map information stored in the terminal storage section 340, i.e., recognizes the updated locality map information and the updated contents of the updated locality map information. For the recognition, the terminal map updating section 353 compares the version information assigned to the locality map information of the existing map information with that of the updated map information, and recognizes the locality map information of the updated map information having the version information newer than that of the existing map information. The terminal map updating section 353 then replaces the locality map information of the existing map information having the old version information with the locality map information of the updated map information to update the map information.

The purchase information generator 354 generates purchase request information as purchase information for purchasing the map information, and transmits the purchase request information to the server unit 400 from the transmitting/receiving device 310 via the network 200. More specifically, the purchase information generator 354 recognizes an operation signal output due to the input operation of the user, and recognizes purchase method information related to whether the user purchases the map information by downloading it via the network 200 or orders to purchase a recording medium storing the map information by post. The purchase method information may include information related to a payment method whether to be paid by a credit card or by bank transfer. And, the purchase information generator 354 recognizes the locality map information of the map information to be purchased, and the version information according to the notice information transmitted from the server unit 400. Further, the purchase information generator 354 recognizes the user input information stored in the terminal storage section 340. Incidentally, the purchase information generator 354 may recognize, for instance, only the user name information and the address information from the user input information. Then, the purchase information generator 354 generates the purchase request information based on the purchase method information, the locality map information, the version information and the user input information, by encrypting the respective pieces of information.

The server unit 400 can transmit/receive information to/from the terminal unit 300, 300A, 300B via the network 200. The server unit 400 is also capable of acquiring various pieces of information from other servers (not shown) of various government offices such as Meteorological Agency and National Police Agency, private organizations and business enterprises via the network 200. The information to be acquired may include traffic information such as weather information, traffic-congestions, traffic accidents, constructions, traffic regulations, etc., map information with shop information about various shops including gasoline stations and restaurants, etc., and map information newly plotted. As shown in FIG. 6, the server unit 400 includes a network interface 410, an input section 420, a display section 430, a server storage section 440, a CPU (Central Processing Unit) 450 also functioning as a computing unit, etc.

The network interface 410 performs a preset input interface processing for a predetermined server signal input via the network 200, and outputs the server signal as a processing server signal to the CPU 450. When the CPU 450 inputs to the network interface 410 the predetermined processing server signal to be transmitted to the terminal unit 300, 300A, 300B, the network interface 410 performs a preset output interface processing for the input processing server signal, and outputs the processing server signal as a server signal to the terminal unit 300, 300A, 300B via the network 200. Note that the server signal can appropriately be output only to a predetermined terminal unit 300, 300A, 300B based on the information described in the processing server signal.

Like the terminal input section 320, the input section 420, which may be a keyboard, a mouse or the like, has various operation buttons and operation knobs (both not shown) to be used for input operation. The operation buttons and the operation knobs are used: to input the setting items for operations of the server unit 400; to set information to be stored in the server storage section 440; and to update the information stored in the server storage section 440. Upon the input operation of the setting items, the input section 420 outputs a predetermined signal corresponding to the settings to the CPU 450 to apply the settings. In place of the input operation using the operation buttons and the operation knobs, input operation using a touch panel arranged on the display section 430, sound input operation and the like may be employed for inputting various settings.

Like terminal display section 330, the display section 430 is controlled by the CPU 450 to display image data from the CPU 450. The image data may be image data from the server storage section 440 and image data acquired from an external server via the network 200.

The server storage section 440 readably stores various pieces of information received from the terminal unit 300, 300A, 300B or from the external server, e.g., the map information with the plural pieces of locality map information as shown in FIGS. 3 and 4, a user information database 10 structured in a table consisting of plural pieces of user information 11 as shown in FIG. 7, a map update history database 20 structured in a table consisting of plural pieces of map update history information 21 as shown in FIG. 8, etc. To be more specific, the server storage section 440, though not shown, includes various information storage areas storing the various pieces of information, the map information storage area as a map information storage section storing the map information, a user information database storage area storing the user information database 10, a map update history database storage area storing the map update history database 20, etc.

Though the server storage section 440 exemplarily has the four storage areas, it is not limited thereto, and the server storage section 440 may not have the above-described storage areas, or may have an additional storage area. In addition, the server storage section 440 may include a drive or a driver for readably storing information on a recording medium such as a HD (Hard Disk), a DVD (Digital Versatile Disc), an optical disc and a memory card. Information to be stored may include, for example, information input by the input operation at the input section 420, and the contents of the information stored with the input operation can be appropriately updated. The server storage section 440 also stores information such as various programs that run on an OS (Operating System) controlling the whole operation of the server unit 400 and the map updating system 100.

Next, the user information database 10 and the map update history database 20 stored in the server storage section 440 will be described below.

As shown in FIG. 7, the user information database 10 is data structured in a table having the plural pieces of user information 11. The user information 11 is generated based on the user input information transmitted from the terminal unit 300, 300A, 300B. The user information 11 is formed as data associating user ID information 12, user name information 13, user detail information 14, address information 15, distribution request information 16 as map update request information, etc. with each other.

The user ID information 12 is unique information for specifying the user information 11. For instance, the user ID information 12 may be unique information storing a number assigned thereto sequentially in the order of storage in the user information database 10, or may include address information such as an e-mail address of the user of the terminal unit 300, 300A, 300B. Or, the user ID information 12 may store information specific to the terminal such as a manufacturing number of the terminal unit 300, 300A, 300B.

The user name information 13 relates to a name of the user. The user name information is generated based on the user name information of the user input information. The user name information may store a legal name of the user, or a temporal handle name set by the user of the terminal unit 300, 300A, 300B.

The user detail information 14 relates to a gender, an address, various passwords of the user. The user name information is generated based on the user detail information of the user input information. The various passwords stored in the user detail information are stored with being properly encrypted.

The address information 15 relates to an e-mail address for making contact with the user, and an IP address for specifying the terminal unit 300, 300A, 300B. Such address information is generated based on the address information of the user input information.

The distribution request information 16 relates to contents of a map desired by the user. The distribution request information 16 is generated based on the request map information of the user input information. The distribution request information 16 stores category information as facility type information, locality information, road information, etc. in the same manner as the request map information. The category information, the locality information, the road information are set as needed with the inputting/setting of the user. For instance, the distribution request information 16 may only store the category information without the locality information and the road information, or may store all the category information, the locality information and the road information. In addition, the category information, the locality information and the road information may respectively store plural pieces of information. For instance, the category information may store categories related to a plurality of facilities such as "a convenience store", "an amusement park", etc.

The map update history database 20 is data structured in a table storing plural pieces of the map update history information 21 as shown in FIG. 8. The map update history information 21 is formed as data associating updated date information 22, updated version information 23, updated contents information 24 as updated contents, subject map information 25, etc. with each other.

The updated date information 22 relates to a date when the map information stored in the server storage section 440 is updated.

The updated version information 23 relates to a revision state of the updated locality map information. The map information stored in the server storage section 440 has the version information for each piece of locality map information, and when the map information is updated, the version information assigned to the updated locality map information is stored in the updated version information 23.

The updated contents information 24 relates to the updated contents of the updated map information and the updated contents of the updated place and the like. The updated contents information 24, for instance, stores the category information, the locality information, the road information as the updated contents corresponding to the contents of the distribution request information 16. For example, when the information about "the convenience store" of the locality map information for "Tokyo" is updated, the updated contents information 24 stores "the convenience store" as the category information, and "Tokyo" as the locality information. It should be noted that, when the server unit 400 controls the network interface 410 to newly acquire the updated map information, the updated contents information 24 may be acquired in addition to the updated map information.

The subject map information 25 relates to the updated locality map information. The subject map information 25 stores information about the updated locality such as "Kanto", "Tokyo", etc.

As shown in FIG. 9, the CPU 450 includes as various programs stored in the server storage section 440, a terminal information recognizer 451, a server map updating section 452 also functioning as version information recognizer, an updated contents recognizer 453 also functioning as a map recognizer and an updated map information recognizer, a user recognizer 454 also functioning as a map update request acquirer, an information transmitter 455 as a map distributor, an order receipt information recognizer 456, etc.

The terminal information recognizer 451 recognizes the user input information transmitted from the terminal unit 300, 300A, 300B, and generates the user information 11 based on the user input information. And, the terminal information recognizer 451 readably stores the generated user information 11 in the user information database 10. Further, the terminal information recognizer 451 also recognizes the purchase request information transmitted from the terminal unit 300, 300A, 300B, and readably stores the information in the server storage section 440. In addition, the terminal information recognizer 451 recognizes the terminal unique information for specifying the terminal unit 300, 300A, 300B, from which the user input information and the purchase request information are transmitted, associates the terminal unique information with the user input information and the purchase request information, and readably stores the associated information in the server storage section 440.

The server map updating section 452 recognizes the existing map information stored in the server storage section 440. And, the server map updating section 452 recognizes the updated map information acquired, for instance, via the network 200. Then, the server map updating section 452 rewrites the existing map information stored in the server storage section 440 with the updated map information of the latest revision state to update the map information. More specifically, the server map updating section 452 receives and recognizes the updated map information transmitted from other server unit or the like, and recognizes the version information of the recognized updated map information. Or, the server map updating section 452 reads and acquires the updated map information stored in the recording medium such as a CD or a DVD, and recognizes the version information of the acquired updated map information. Then the server map updating section 452 compares the version information of the map information stored in the server storage section 440 with the version information of the acquired updated map information, and rewrites the map information stored in the server storage section 440 with the acquired updated map information if determining that the version information of the acquired updated map information is new.

The updated contents recognizer 453 recognizes the updated contents of the acquired updated map information when the server map updating section 452 determines that the acquired updated map information is newer than the map information stored in the server storage section 440. To be more specific, the updated contents recognizer 453 compares the existing map information stored in the server storage section 440 with the acquired updated map information, and recognizes the locality map information of the updated locality. And, the updated contents recognizer 453 compares the existing map information stored in the server storage section 440 with the acquired updated map information, and recognizes the category information about the category of an updated facility, and the road information about an updated road or a road around the updated place. Then, the updated contents recognizer 453 generates the updated contents information 24 based on the category information, the locality information, and the road information corresponding to the updated place. The updated contents recognizer 453 also generates the map update history information 21 based on the recognized updated locality map information and the updated contents information 24, and readably stores the generated information in the map update history database 20.

The user recognizer 454 recognizes the terminal unit 300, 300A, 300B of which the map information is to be updated, based on the map update history database 20 and the user information database 10. More specifically, when the server map updating section 452 recognizes that the map is updated, the user recognizer 454 recognizes the updated contents information 24 of the map update history information 21 in the map update history database 20, and the distribution request information 16 of the user information 11 in the user information database 10. Then, if the updated contents information 24 includes the requested contents stored in the distribution request information 16, the user recognizer 454 determines that the updated contents information 24 corresponds to the distribution request information 16, and recognizes the user information 11 containing the distribution request information 16. For example, when the updated contents information 24 stores the contents of "Tokyo" as well as "the convenience store", the user recognizer 454 recognizes the user information 11 in which the distribution request information 16 contains "Tokyo" and "the convenience store".

The information transmitter 455 recognizes the terminal unit 300, 300A, 300B corresponding to the user information 11 based on the user information 11 recognized by the user recognizer 454. Then, the information transmitter 455 generates notice information for notifying that the map has been updated, and transmits the notice information to the recognized terminal unit 300, 300A, 300B. The information transmitter 455 also transmits the updated map information which is updated to the recognized terminal unit 300, 300A, 300B. In addition, the information transmitter 455 transmits the demo version map information as the restricted map information to the recognized terminal unit 300, 300A, 300B. The demo version map information may be map information with a restricted trial period allowing the user to browse the map information, and map information with a restricted display area. It should be noted that the information transmitter 455 may transmit the notice information, the map information, and the demo version map information to the terminal unit 300, 300A, 300B by e-mail or by using various communication protocols such as FTP (File Transfer Protocol), or, by notifying a link to allow the terminal unit 300, 300A, 300B to connect the link for acquiring the notice information, the updated map information and the demo version map information. When transmitting the updated map information, the information transmitter 455 transmits the information such that each piece of locality map information forming the updated map information can be rewritten.

The order receipt information recognizer 456 recognizes the purchase request information transmitted from the terminal unit 300, 300A, 300B, and recognizes the purchase method information of the map information, the version information of the locality map information to be purchased, and the user input information. And, the order receipt information recognizer 456 recognizes the address information 15 of the user information 11 based on the user input information when the purchase method information describes, for instance, an instruction of downloading of the information via the network 200. Then, the order receipt information recognizer 456 specifies the terminal unit 300, 300A, 300B based on the address information 15, and allows the information transmitter 455 to transmit the updated map information to be purchased.

In addition, the order receipt information recognizer 456 recognizes the user detail information of the user information 11 when the purchase method information describes, for instance, an instruction of ordering and purchasing the recording medium storing the map information by post. Then, the order receipt information recognizer 456 determines whether the user detail information 14, for example, has shipping address information to which the recording medium is sent such as an address of the user. When the user detail information 14 does not have the shipping address information, the order receipt information recognizer 456 allows the information transmitter 455 to notify the lack of the shipping address information to the terminal unit 300, 300A, 300B. On the other hand, when the user detail information 14 has the shipping address information, the order receipt information recognizer 456 generates shipping wait information based on the shipping address information and the version information of the updated map information, and readably stores the shipping wait information in the server storage section 440. Further, upon the generation of the shipping wait information, the order receipt information recognizer 456 controls the display section 430 to indicate the presence of the shipping wait information.

[Operation of Map Updating System]

Figure 10:
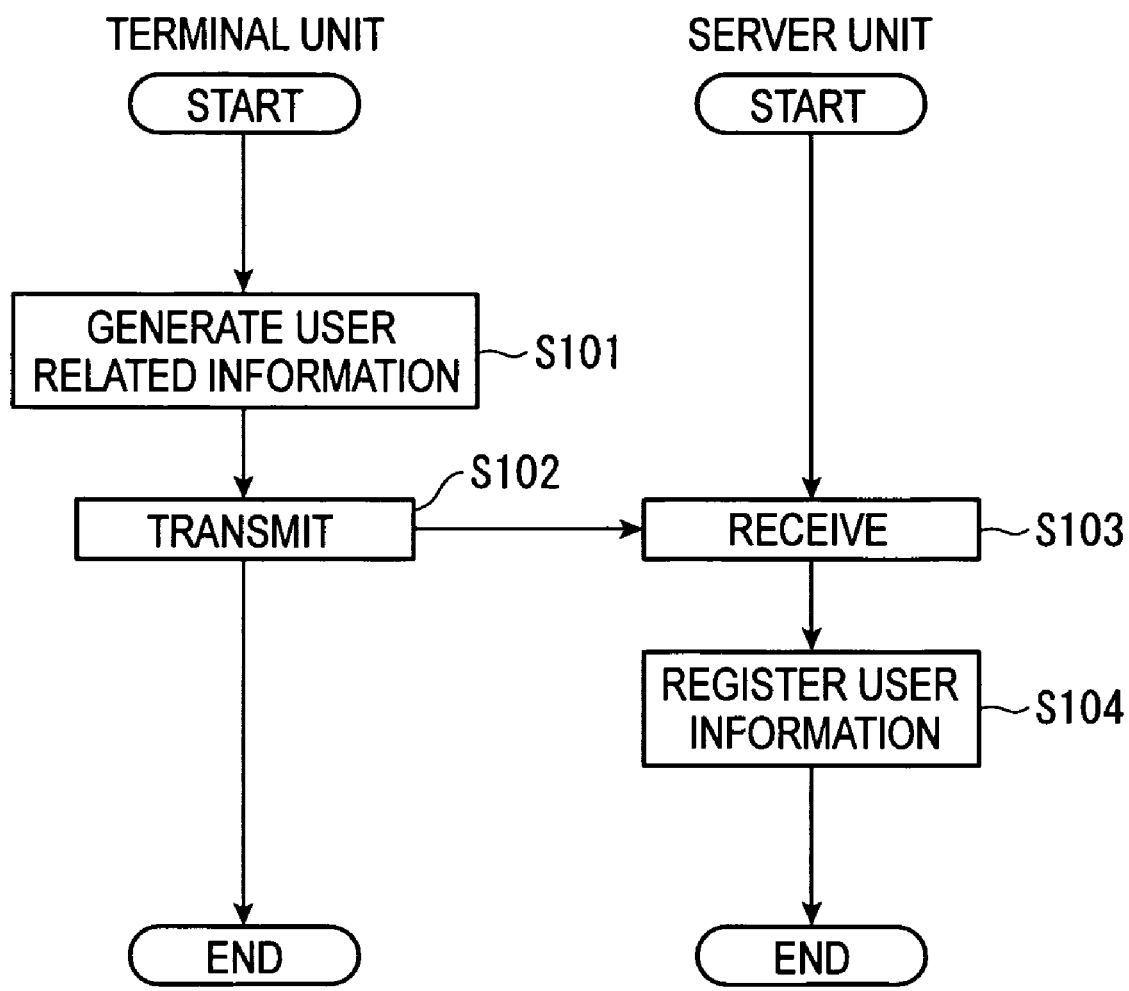
FIG. 10 is a flowchart showing a user registration processing.
Figure 11:
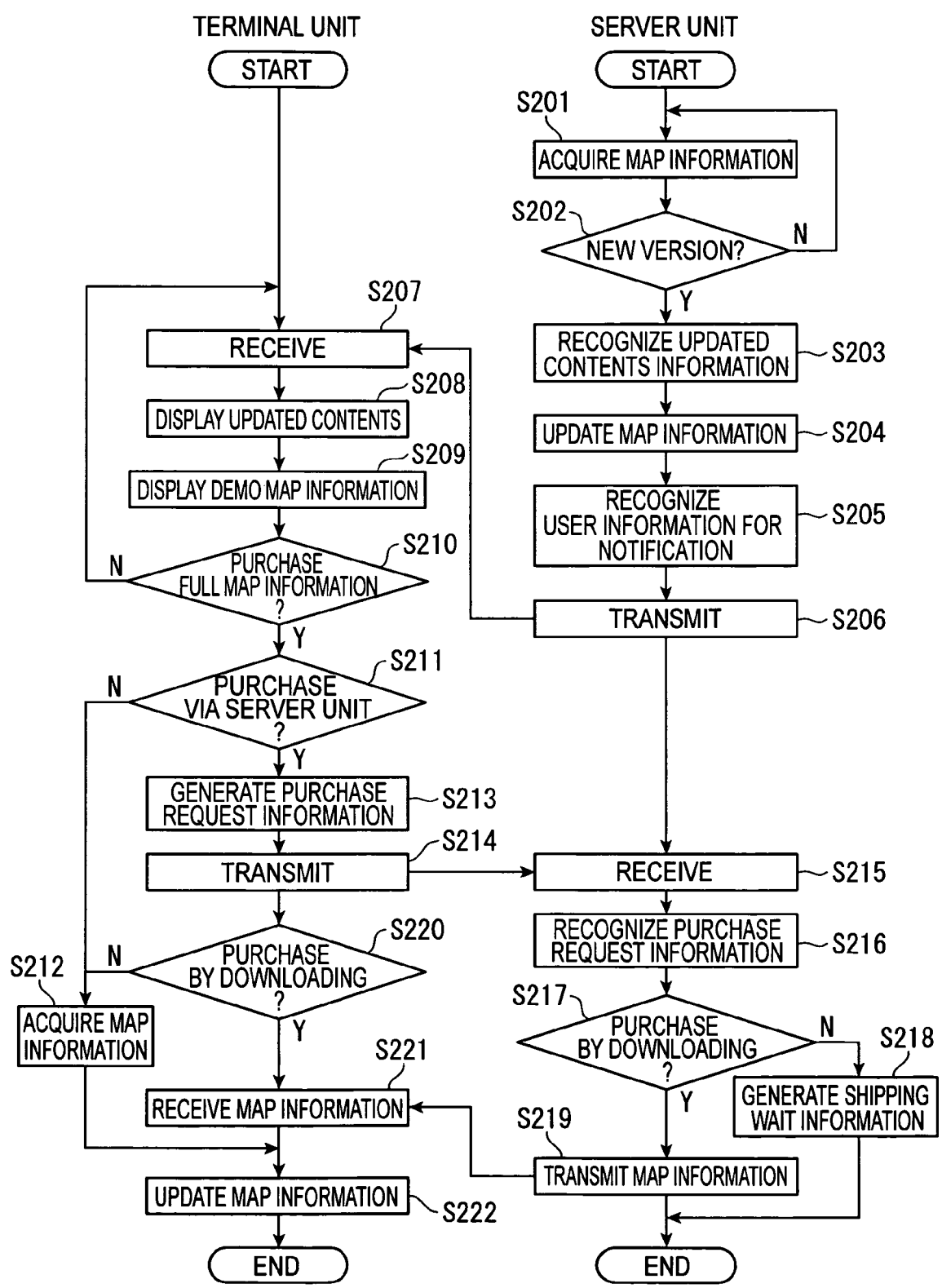
FIG. 11 is a flowchart showing a map update processing.

Next, operation of the map updating system 100 will be described below according to FIGS. 10 and 11. FIG. 10 is a flowchart showing a user registration processing. FIG. 11 is a flowchart showing a map update processing.

In FIG. 10, when the user purchases the terminal unit 300, 300A, 300B, and activates it, the processor 350 controls the terminal display section 330 to instruct the user to input the various information related to the user.

Then, when the user operates the terminal input section 320 and inputs the various information, the input information recognizer 351 of the processor 350 generates the user input information based on the input various information (step S101). To be more specific, the input information recognizer 351 of the processor 350 recognizes the user name information about the legal name or the handle name of the user, the user detail information about the gender and the address of the user and the address information about the e-mail address of the user, the request map information about the contents of the map that the user wants to update, based on the inputting/setting of the user, and generates the user input information based on each information.

Then, the processor 350 of the terminal unit 300 controls the transmitting/receiving device 310 and transmits the user input information to the server unit 400. At this time, the processor 350 also transmits the terminal unique information for specifying the terminal unit 300, such as the manufacturing number assigned to each terminal unit 300 etc. (step S102).

When receiving the user input information transmitted from the terminal unit 300 (step S103), the server unit 400 allows the terminal information recognizer 451 of the CPU 450 to generate the user information 11 based on the received user input information. And, the terminal information recognizer 451 readably stores the user information 11 in the user information database 10, and terminates the user registration processing (step S104).

Next, referring to FIG. 11, the map update processing of the map updating system 100 will be described below.

In FIG. 11, the CPU 450 of the server unit 400 controls the network interface 410 to acquire the map information from the external server unit via the network. Or, the CPU 450 acquires the map information from the recording medium (step S201).

Then, the server map updating section 452 of the CPU 450 recognizes the version information of the acquired map information, compares the acquired version information with the version information of the existing map information stored in the server storage section 440, and determines whether the acquired map information is new (step S202).

In step S202, when recognizing that the acquired map information is new, the updated contents recognizer 453 of the CPU 450 compares the existing map information stored in the storage section with the acquired updated map information, and recognizes the updated locality map information. The updated contents recognizer 453 also recognizes the updated contents of the updated locality map information, namely, the category information, the road information, etc. Then, the updated contents recognizer 453 generates the map update history information 21 based on the locality information, the category information, and the road information (step S203). In addition, the updated contents recognizer 453 readably stores the generated map update history information 21 in the map update history database 20.

Then, the server map updating section 452 of the CPU 450 rewrites the existing map information stored in the server storage section 440 with the acquired updated map information to update the map information (step S204).

Subsequently, the user recognizer 454 of the CPU 450 recognizes the updated contents information 24 of the map update history information 21 generated in step S203, and the distribution request information 16 of the user information 11 in the user information database 10. If the updated contents information 24 includes the requested contents stored in the distribution request information 16, the user recognizer 454 determines that the updated contents information 24 corresponds to the distribution request information 16, and recognizes the user information 11 containing the distribution request information 16 (step S205).

The user recognizer 454 then reads the address information 15 of the user information 11 recognized in step S205, and allows the information transmitter 455 to transmit the notify information for notifying that the map has been updated to the e-mail address stored in the address information 15 as the destination by e-mail (step S206). The user recognizer 454 also allows the information transmitter 455 to transmit the demo version map information to the terminal unit 300, 300A, 300B. Note that the information transmitter 455 may transmit the demo version map information, for instance, by attaching it with the notify information transmitted by e-mail.

When receiving the notify information and the demo version map information transmitted from the server unit 400 in step S206 (step S207), the processor 350 of the terminal unit 300 allows the display controller 352 to control the terminal display section 330 for displaying the information related to the updated contents of the map information (step S208). The contents to be displayed may be the information related to the target area to be updated, and related to the contents to be updated.

Further, the display controller 352 of the processor 350 controls the terminal display section 330 to display the demo version map information received in step S207 (step S209). At this time, the display controller 352 allows the terminal display section 330 to display the updated part of the updated locality map information with an expression different from the not-updated part, based on the updated contents information indicated in the notify information received. For example, as described above, the sign "new" may be displayed in the vicinity of the updated contents. It should be noted that the expression might be any as long as the updated part is displayed in a distinctive manner, so that the user can find the part at a glance.

After that, the processor 350 controls the display controller 352 to allow the terminal display section 330 to display the information for asking the user whether the user purchases full version map information, and when the user purchases it, whether the user purchases it via the server unit 400. Then, the processor 350 determines whether an input signal indicating that the user purchases the full version map information (step S210).

In step S210, when recognizing the input signal of purchasing the full version map information, the processor 350 determines whether there is the information of purchasing the map information via the server unit 400 (step S211).

In step S211, when recognizing the information of purchasing the map information not via the server unit 400, the processor 350 allows the terminal display section 330 to display guidance like "please purchase full version map information in a shop", for instance. The processor 350 also allows the terminal display section 330 to display information related to shops available for the recording medium storing the full version map information. Then, if the user purchases the recording medium storing the map information, and inserts the recording medium to e.g. a drive (not shown) so that the map information is input, the processor 350 acquires the new map information from the recording medium (step S212).

On the other hand, in step S211, when recognizing the information for purchasing the map information via the server unit 400, the processor 350 allows the purchase information generator 354 to generate the purchase request information of purchasing the map information (step S213). More specifically, the purchase information generator 354 recognizes the operation signal output by the input operation of the user to recognize the purchase method information related to the purchase method of the map information. The purchase information generator 354 also recognizes the version information of the locality map information to be purchased, and recognizes the purchase request information.

After step S213, the processor 350 of the terminal unit 300 controls the transmitting/receiving device 310 to transmit the generated purchase request information to the server unit 400. At this time, the processor 350 also transmits the terminal unique information for specifying the terminal unit 300, such as the manufacturing number assigned to each terminal unit 300 etc.

When receiving the input signal transmitted from the terminal unit 300, 300A, 300B (step S215), the terminal information recognizer 451 of the CPU 450 of the server unit 400 recognizes the purchase request information included in the input signal (step S216). Then the order receipt information recognizer 456 of the CPU 450 recognizes the purchase method information included in the received purchase request information, and determines whether the map information is purchased by downloading (step S217).

In step S217, when the purchase method information does not store the information of purchasing the map information by downloading via the network 200, namely, stores the information of purchasing the map information by acquiring the recording medium by post for instance, the order receipt information recognizer 456 of the CPU 450 generates the shipping wait information based on the user information 11 and the purchase request information, and readably stores the generated information in the server storage section 440. And, the order receipt information recognizer 456 controls the display section 430 to display the screen to indicate the presence of the shipping wait information. For instance, the administrator of the server unit 400 then checks the shipping wait information on the display section 430, and sends the recording medium storing the updated map information to the address described in the shipping address information stored in the user detail information 14 of the user information 11.

On the other hand, in step S217, when the purchase method information stores the information of purchasing the map information by downloading via the network 200, the order receipt information recognizer 456 of the CPU 450 controls the information transmitter 455 to transmit the predetermined map information to the terminal unit 300 (step S219).

Then, when the processor 350 of the terminal unit 300 has generated the purchase request information including the purchase method information for purchasing the map information by downloading in step S213, the processor 350 receives the updated map information transmitted in step S219 (step S221).

On the other hand, when the processor 350 of the terminal unit 300 has not generated the purchase request information including the purchase method information of purchasing the map information by downloading in step S213, namely, when the processor 350 has generated the purchase request information including the purchase method information for purchasing the recording medium storing the map information by post, the processor performs step S212 to acquire the updated map information from the recording medium sent by post.

Then, the terminal map updating section 353 of the processor 350 recognizes the locality map information to be updated included in the acquired updated map information, and its version information. The processor 350 compares the version information of the locality map information of the existing map information stored in the terminal storage section 340 with that of the updated map information, and when determining that the version information of the updated map information is new, rewrites the predetermined locality map information of the existing map information with the locality map information of the updated map information to update the map information.

[Effects and Advantages of Map Updating System]

As described above, according to the map updating system 100 of the aforesaid embodiment, the server unit 400 allows the updated contents recognizer 453 to recognize the updated contents of the updated map information and to generate the updated contents information 24, and allows the user recognizer 454 to recognize the distribution request information 16 generated based on the user input information transmitted from the terminal unit 300, 300A, 300B. When the user recognizer 454 determines that the contents of the distribution request stored in the distribution request information 16 is included in the updated contents information 24, the server unit 400 allows the user recognizer 454 to recognize the user information 11 having the distribution request information 16. The server unit 400 allows the information transmitter 455 to transmit the updated map information to the terminal unit 300, 300A, 300B corresponding to the user information 11 such that only the updated locality map information can be rewritten. Accordingly, the user recognizer 454 of the CPU 450 can determine whether the updated map information is the map desired by the user in a simple manner by comparing the distribution request information 16 with the updated contents information 24. Hence, the server unit 400 can provide the map information desired by the user to the terminal unit 300. And, since the updated map information is distributed such that only the locality map information of the updated locality can be rewritten, the terminal unit 300, 300A, 300B only requires to update the locality map information of the updated locality in the map information, so that the processing load of the processor 350 due to the map update processing can be reduced.

In addition, the server map updating section 452 of the CPU 450 recognizes the version information of the existing map information stored in the server storage section 440 and the version information of the updated map information, and when determining that the version information of the updated map information is newer than the version information of the existing map information, updates the map information of the server storage section 440. Accordingly, the revision state of the map information can easily be determined by the version information, so that the map information to be stored in the server storage section 440 can always be maintained the latest.

The distribution request information 16 has the category information related to the category of the facility. The server unit 400 allows the user recognizer 454 to compare the updated contents information 24 of the updated map information with the distribution request information, and when it is determined that the updated contents information 24 stores the category information of the distribution request information, allows the information transmitter 455 to distribute the updated map information. Therefore, the updated map information can be distributed to the terminal unit 300, 300A, 300B only when the facility that the user is interested in is updated. The map information not desired by the user will not be distributed, and the updated contents is obvious, so that the map information desired by the user can be provided.

The distribution request information 16 has the locality information related to the locality. Hence, the information transmitter 455 of the CPU 450 can distribute the updated map information, when the map information related to the locality where the user often uses, such as a house or an office of the user, is updated. Similarly, the distribution request information 16 has the road information related to the road. Hence, the information transmitter 455 of the CPU 450 can distribute the updated map information, when the map information related to the locality along the road where the user is interested in, such as a road that the user often passes or a main road located in the locality where the user often use, is updated.

When determining that the updated contents information 24 stores the contents of the distribution request information 16, the server unit 400 allows the user recognizer 454 to recognize the user information 11 including the distribution request information 16, and to transmit to the terminal unit 300, 300A, 300B corresponding to the user information 11 the notice information for notifying the presence of the updated map information corresponding to the distribution request information. Therefore, the user can be informed that the map has been updated upon the notice information. And, the information transmitter 455 transmits the notice information containing the updated contents based on the updated contents information 24. Thus, the user can check the updated contents of the updated map. Hence, the user can know what is particularly updated in the updated map information easily.

Further, when determining that the updated contents information 24 stores the contents of the distribution request information 16, the server unit 400 recognizes the user information 11 including the distribution request information 16, and transmits the demo version map information to the terminal unit 300, 300A, 300B corresponding to the user information 11. Therefore, the user can use the updated map information for trial with the demo version map information, and easily determine whether the updated map information is necessary for the user. The user can acquire the updated map information if he/she wants to purchase after using the demo version map information for trial. Accordingly, the server unit 400 can provide only the updated map information desired by the user.

When the order receipt information recognizer 456 recognizes the purchase request information, the CPU 450 of the server unit 400 transmits the updated map information desired by the user to the terminal unit 300 based on the recognized purchase request information. Hence, the user need not purchase the full version map information if it is not acceptable after the trial of the demo version map information, and may purchase full version map information only if it is acceptable. Thus, the user will not purchase the unnecessary map information, so that the map information proper for the user can be provided.

The terminal unit 300 allows the terminal map updating section 353 to acquire the updated map information and rewrite the locality map information to be updated of the existing map information with the locality map information of the updated map information to update the map information. Therefore, the user can update only the locality map information that he/she wants to update. Thus, the locality map information of other locality unnecessary to be updated is not updated, so that unnecessary update can be avoided.

In addition, the terminal unit 300 allows the input information recognizer to generate the request map information by the inputting/setting of the user, and allows the terminal map updating section 353 to acquire the updated map information corresponding to the contents of the request map information.

Hence, the terminal unit 300 can acquire only the updated map information desired by the user, and the unnecessary update can be avoided.

Further, the terminal unit 300 receives the notice information transmitted from the server unit 400, and allows the terminal display section 330 to display and notify the notice information. Hence, when the user operates the terminal unit 300, the information for notifying the presence of the updated map information can be displayed on the terminal display section 330. Thus, the presence of the updated map information as well as the contents thereof can be notified to the user promptly.

Then, the terminal unit 300 receives the demo version map information from the server unit 400 and controls the terminal display section 330 to display the information. Hence, the user can evaluate the value of the updated map information upon the demo version map information displayed on the terminal display section 330. Therefore, since the user can figure out the value of the demo version map information prior to the purchase of the full version map information, the user will not purchase the unnecessary full version map information and can acquire only the desirable map information.

And, the display controller 352 controls the display section to display the updated part of the demo version map information and of the updated map information with the expression different from that of the not-updated part. Therefore, the user can find out what is particularly updated in the updated map information easily. Thus, the user can recognize the difference between the updated map information and the existing map information in a simple manner.

Modifications of Embodiment

The present invention is not limited to the above specific embodiment, but includes modifications and improvements as long as the object of the present invention can be attained.

Specifically, the terminal unit 300, 300A, 300B may be any devices, such as a portable navigation device, a PDA (Personal Digital Assistant), a mobile phone, a PHS (Personal Handyphone System), a portable personal computer, and a desktop personal computer in addition to an in-vehicle navigation device mounted on a vehicle,.

Though the server map updating section 452 of the CPU 450 rewrites the existing map information stored in the server storage section 440 with the updated map information to update the map information in the above-described embodiment, the newly acquired map information may be stored in the server storage section 440. With this configuration, since the map information corresponding to the prior version information is also stored, for instance, when the user wants to acquire the map information corresponding to the prior version information, or when the user wants to check the map information corresponding to the prior version information, the user can acquire the prior map information stored in the server storage section 440.

Further, the processor 350 of the terminal unit 300, when allowing the terminal map updating section 353 to update the map information, controls the terminal display section 330 to display the information for asking the user whether the existing map information is rewritten with the newly acquired map information to update the map information. With this configuration, the terminal map updating section 353 updates the map information only when recognizing the acquired request information for updating the map information, for instance, upon the inputting/setting of the user.

Though the terminal unit 300 acquires the updated map information from the server unit 400 via the network 200 or acquires the updated map information stored in the recording medium in the above-described embodiment, it is not limited thereto. For example, the terminal unit 300 may acquire the map information from other server unit that sales the map information.

Though the server unit 400 allows the information transmitter 455 to transmit the updated map information to the terminal unit 300, 300A, 300B in the above-described embodiment, it is not limited thereto, and the information transmitter 455 may transmit only the locality map information to be updated of the updated contents information 24 to the terminal unit 300, 300A, 300B. In this case, the information transmitter 455 recognizes the subject map information 25 of the map update history information 21 and transmits the locality map information of the locality stored in the subject map information 25 to the terminal unit 300, 300A, 300B. With such configuration, since the information transmitter 455 transmits only the necessary locality map information via the network 200, the information amount to be transmitted can be reduced.

Though the request map information includes the category information, the locality information and the road information in the above-described embodiment, it is not limited thereto. For example, the request map information may be information related to interval of update period or may be information related to the amount of updated information. When the interval of the update period is set as the request map information the map information may be updated per two years for instance. When the information related to the amount of the updated information is set as the request map information, for instance, the map information may be updated if the updated contents holds a predetermined amount or more. Note that the request map information may include other information.

Further, as described above, the purchase information generator 354 of the terminal unit 300 may additionally have information related to the payment method in the purchase request information. The information related to the payment method may be information storing a credit card number, information indicating the payment by bank transfer, etc. When the purchase request information stores the information describing the credit card number, the server unit 400 may allow the information transmitter 455 to transmit the full version map information immediately. Or, when the purchase request information stores the information of the payment by bank transfer, the server unit 400 may allow the information transmitter 455 to transmit the information related to the guidance on an account for bank transfer by e-mail etc. to the terminal unit 300, 300A, 300B immediately.

Though the information transmitter 455 notifies that the map information has been updated to the terminal unit 300, 300A, 300B by e-mail in the above-described embodiment, it is not limited thereto. For example, the information transmitter 455 may transmit link information linked to a website providing the updated contents of the map information, as stated above.

Though the server unit 400, when recognizing the purchase request information, allows the information transmitter 455 to transmit the full version map information, or generate the shipping wait information for indicating that the recording medium storing the full version map information is shipped in the above-described embodiment, it is not limited thereto. For example, when the demo version map information is restricted, for instance, by applying a predetermined processing to set the trial period for the full version map information, the server unit 400 may transmit an unlock code as unlock information for unlocking the restriction of the demo version map information upon the recognition of the purchase request information. Then, the processor 350 of the terminal unit 300, when recognizing the unlock code, unlocks the restriction of the demo version map information with the unlock code to recognize it as the full version map information. With such configuration, the user does not need to download the full version information, to order the recording medium storing the full version map information by post, or to purchase the recording medium in a shop, and can easily acquire the map information.

Though the purchase information generator 354 of the processor 350 of the terminal unit 300 generates the purchase request information, and transmits the purchase request information to the server unit 400 to purchase the full version map information from the server unit 400 in the above-described embodiment, the server unit 400 may transmit the map information to the terminal unit 300 each time when recognizing the map information desired by the user. In this case, the purchase request information may not be generated if the user is allowed to acquire free map information within a certain period certificated according to yearly contract etc.

Though the information transmitter 455 of the server unit 400 transmits the updated map information in the above-described embodiment, the information transmitter 455 may transmit only the locality map information to be updated of the updated map information.

In the above-described embodiment, though the server unit 400 acquires the map information desired by the user and transmits the map information to the terminal unit 300, it is not limited thereto. For example, there may be a map processing device that recognizes request map information as updated map request information, generates updated map distribution request information for distributing the updated map information corresponding to the requested contents of the request map information such that only the updated locality map information can be rewritten, and transmits the generated information to a server unit from a transmitting/receiving section as an updated map distribution request transmitter. In this case, the server unit transmits the updated map information to the map processing device based on the transmitted updated map distribution request information. In the map processing device, the transmitting/receiving section receives the transmitted updated map information, and rewrites the existing map information stored in a storage section with an updated part of the updated map information, i.e., with the transmitted locality map information to store the rewritten map information. With this configuration, the map processing device can acquire the map information desired by the user.

Incidentally, though the above-described embodiment mainly describes that the user can acquire the information (the demo version map information, the updated map information, etc.) desired by the user in view of the user, the manufacturer and the administrator can utilize this configuration to increase sales effectiveness or to promote campaigns etc. by allowing the information with expiration date, such as the demo version map information desired by the user, to be distributed.

While the functions are realized in the form of programs in the above description, the functions may be realized in any form including hardware such as a circuit board or an element such as IC (Integrated Circuit). In view of easy handling and promotion of the use, the functions are preferably stored and read from programs or recording media.

The arrangements and the operating procedures for the present invention may be appropriately modified as long as the scope of the present invention can be attained.

Advantages of Embodiment

As described above, according to the map updating system 100 of the aforesaid embodiment, the server unit 400 allows the updated contents recognizer 453 to recognize the updated contents of the updated map information and to generate the updated contents information 24, and allows the user recognizer 454 to recognize the distribution request information 16 generated based on the user input information transmitted from the terminal unit 300, 300A, 300B. Then, when the user recognizer 454 determines that the contents of the distribution request stored in the distribution request information 16 is included in the updated contents information 24, the server unit 400 allows the user recognizer 454 to recognize the user information 11 having the distribution request information 16. Then, the server unit 400 allows the information transmitter 455 to transmit the updated map information to the terminal unit 300, 300A, 300B corresponding to the user information 11 such that only the updated locality map information can be rewritten. Accordingly, the user recognizer 454 of the CPU 450 can determine whether the updated map information is the map desired by the user in a simple manner by comparing the distribution request information 16 with the updated contents information 24. Thus, the server unit 400 can provide the map information desired by the user to the terminal unit 300.

The priority application Number JP2005-010943 upon which this patent application is based is hereby incorporated by reference.

What is claimed is:

1. A map distributing device, comprising:
    a storage section that stores map information;
    a map recognizer that recognizes updated map information for updating the map information;
    an updated contents information recognizer that compares the map information with the updated map information to recognize updated contents information that is updated contents of the updated map information;
    a map update request acquirer that acquires map update request information that specifies contents of the map information to be updated from a map acquiring device in which the map information is beforehand stored; and
    a map distributor that compares the updated contents information with the map update request information, and distributes the updated map information to the map acquiring device when the updated contents information corresponds to the contents specified by the map update request information, wherein
    the map update request information contains any one of: facility type information indicating a type of a predetermined facility of the map information; locality information indicating a predetermined locality of the map information; and road information indicating a predetermined road of the map information,
    the map distributor distributes the updated map information to the map acquiring device when: the map update request information contains the facility type information but does not contain the locality information and the road information; and the updated contents information is contents indicating that a facility corresponding to the predetermined facility of the facility type information has been changed,
    the map distributor distributes the updated map information to the map acquiring device when: the map updated request information contains the locality information but does not contain the facility type information and the road information: and the updated contents information is contents indicating that a locality corresponding to the predetermined locality of the locality information has been changed, and the map distributor distributes that updated map information to the map acquiring device when: the map updated request information contains the road information but does not contain the facility type information and the locality information; and the updated contents information is contents indicating that at least one of a road corresponding to the predetermined road of the road information and a vicinity of the road has been changed.

2. The map distributing device according to claim 1, wherein the map distributor distributes notice information related to the updated map information corresponding to the predetermined updated contents requested by the map update request information such that the map acquiring device can notify the notice information.

3. The map distributing device according to claim 1, wherein the map distributor distributes the updated map information to the map acquiring device such that the updated contents of the updated contents information can be displayed on a display, section of the map acquiring device in an expression different from a not-updated area of the updated map information.

4. The map distributing device according to claim 1, wherein the map distributor distributes the updated map information corresponding to the contents requested by the map update request information such that the updated map information is processed with a predetermined processing restriction in the map acquiring device.

5. The map distributing device according to claim 4, wherein the map distributor distributes the updated map information corresponding to the request of the map update request information, or distributes unlock information to unlock the processing restriction when recognizing purchase information related to purchase of the updated map information.

6. A map acquiring device, comprising:
a storage section that stores map information;
a map update request information generator that generates map update request information that specifies contents of the map information to be updated;
a map acquirer that transmits the map update request information to a map distributing device for distributing updated map information for updating the map information, and acquires the updated map information having the updated contents corresponding to the contents of the map update request information from the map distributing device; and
a map storing processor that rewrites the map information with the updated map information and stores the updated map information, wherein
the map update request information contains any one of: facility type information indicating a type of a predetermined facility of the map information; locality information indicating a predetermined locality of the map information; and road information indicating a predetermined road of the map information,
the map acquirer acquires the updated map information to the map acquiring device when: the map update request information contains the facility type information but does not contain the locality information and the road information; and the updated contents information is contents indicating that a facility corresponding to the predetermined facility of the facility type information has been changed, the map acquirer acquires the updated map information to the map acquiring device when: the map updated request information contains the locality information but does not contain the facility type information and the road information; and the updated contents information is contents indicating that a locality corresponding to the predetermined locality of the locality information has been changed, and the map acquirer acquires the updated map information to the map acquiring device when: the map updated request information contains the road information but does not contain the facility type information and the locality information; and the updated contents information is contents indicating that at least one of a road corresponding to the predetermined road of the road information and a vicinity of the road has been changed.

7. The map acquiring device according to claim 6, wherein the map acquiring device includes a display controller that allows a display section to display the updated contents of the updated contents information in an expression different from a not-updated area of the updated map information.

8. The map acquiring device according to claim 6, wherein the map acquirer acquires the updated map information corresponding to the contents requested by the map update request information such that the updated map information has been processed with a predetermined processing restriction.

9. A map processing system, comprising:
a map distributing device; and
a map acquiring device, wherein
the map distributing device includes:
a storage section that stores map information;
a map recognizer that recognizes updated map information for updating the map information;
an updated contents information recognizer that compares the map information with the updated map information to recognize updated contents information that is updated contents of the updated map information;
a map update request acquirer that acquires map update request information that specifies contents of the map information to be updated from the map acquiring device in which the map information is beforehand stored;
a map distributor that compares the updated contents information with the map update request information, and distributes the updated map information to the map acquiring device when the updated contents information corresponds to the contents specified by the map update request information, and
the map acquiring device includes:
a map acquirer connected to the map distributing device via a network and acquiring the updated map information distributed from the map distributing device; and
a storage section that stores the map information and rewrites the map information with the updated map information distributed from the map distributing device,
the map update request information contains any one of: facility type information indicating a type of a predetermined facility of the map information; locality information indicating a predetermined locality of the map information; and road information indicating a predetermined road of the map information,
the map distributor distributes the updated map information to the map acquiring device when: the map update request information contains the facility type information but does not contain the locality information and the road information; and the updated contents information is contents indicating that a facility corresponding to the predetermined facility of the facility type information has been changed, the map distributor distributes the updated map information to the map acquiring device when: the map updated request information contains the locality information but does not contain the facility type information and the road information; and the updated contents information is contents indicating that a locality corresponding to the predetermined locality of the locality information has been changed, and the map distributor distributes that updated map information to the map acquiring device when: the map updated request information contains the road information but does not contain the facility type information and the locality information: and the updated contents information is contents indicating that at least one of a road corresponding to the predetermined road of the road information and a vicinity of the road has been changed.

10. A map processing system, comprising:

a map acquiring device; and a map distributing device connected to the map acquiring device via a network and receiving map update request information from the map acquiring device to distribute the updated map information corresponding to the map update request information, the map distributing device including a map recognizer that recognizes map information, updated contents information related to updated contents of the map information, and updated map information representing updated map information representing an updated map, wherein the map acquiring device includes:

a storage section that stores map information;

a map update request information generator that generates map update request information that specifies contents of the map information to be updated;

a map acquirer that transmits the map update request information to a map distributing device for distributing updated map information for updating the map information, and acquires the updated map information having the updated contents corresponding to the contents of the map update request information from the map distributing device; and a map storing processor that rewrites the map information with the updated map information and stores the updated map information, the map update request information contains any one of: facility type information indicating a type of a predetermined facility of the map information; locality information indicating a predetermined locality of the map information; and road information indicating a predetermined road of the map information, the map acquirer acquires the updated map information to the map acquiring device when: the map update request information contains the facility type information but does not contain the locality information and the road information; and the updated contents information is contents indicating that a facility corresponding to the predetermined facility of the facility type information has been changed, the map acquirer acquires the updated map information to the map acquiring device when: the map updated request information contains the locality information but does not contain the facility type information and the road information; and the updated contents information is contents indicating that a locality corresponding to the predetermined locality of the locality information has been changed, and the map acquirer acquires the updated map information to the map acquiring device when: the map updated request information contains the road information but does not contain the facility type information and the locality information; and the updated contents information is contents indicating that at least one of a road corresponding to the predetermined road of the road information and a vicinity of the road has been changed.

11. A map processing system, comprising:

a map distributing device; and a map acquiring device connected to the map distributing device via a network, wherein the map distributing device includes:

a storage section that stores map information:, a map recognizer that recognizes updated map information for updating the map information;

an updated contents information recognizer that compares the map information with the updated map information to recognize updated contents information that is updated contents of the updated map information;

a map update request acquirer that acquires map update request information that specifies contents of the map information to be updated from the map acquiring device in which, the map information is beforehand stored; and a map distributor that compares the updated contents information with the map update request information, and distributes the updated map information to the map acquiring device when the updated contents information corresponds to the contents specified by the map update request information, the map acquiring device includes:

a storage section that stores the map information;

a map update request information generator that generates the map update request information for requesting distribution of the predetermined updated contents of the map information;

a map acquirer that transmits the map update request information to the map distributing device for distributing the updated map information related to updated contents of the map information, and acquires the updated map information having the updated contents corresponding to the contents of the map update request information from the map distributing device; and a map storing processor that rewrites the map information with the updated map information and stores the updated map information, the map update request information contains any one of: facility type information indicating a type of a predetermined facility of the map information; locality information indicating a predetermined locality of the map information; and road information indicating a predetermined road of the map information, the map distributor distributes the updated map information to the map acquiring device when: the map update request information contains the facility type information but does not contain the locality information and the road information; and the updated contents information is contents indicating that a facility corresponding to the predetermined facility of the facility type information has been changed, the map distributor distributes the updated map information to the map acquiring device when: the map updated request information contains the locality information but does not contain the facility type information and the road information; and the updated contents information is contents indicating that a locality corresponding to the predetermined locality of the locality information has been changed, and the map distributor distributes that updated map information to the map acquiring device when: the map updated request information contains the road information but does not contain the facility type information and the locality information; and the updated contents information is contents indicating that at least one of a road corresponding to the predetermined road of the road information and a vicinity of the road has been changed.

12. A map distributing method, comprising:

storing map information in a storage section;

recognizing the map information and updated map information for updating the map information;

comparing the map information with the updated map information to recognize updated contents information that is updated contents of the updated map information;

acquiring map update request information that specifies contents of the map information to be updated from a map acquiring device in which the map information is beforehand stored; and comparing the updated contents information with the map update request information to distribute the updated map information to the map acquiring device when the updated contents information corresponds to the contents specified by the map update request information; wherein the map update request information contains any one of: facility type information indicating a type of a predetermined facility of the map information; locality information indicating a predetermined locality of the map information; and road information indicating a predetermined road of the map information, the updated map information is distributed to the map acquiring device when: the map update request contains the facility type information but does not contain the locality information and the road information; and the updated contents information is contents indicating that a facility corresponding to the predetermined facility of the facility type information has beer changed, the updated man information is distributed to the map acquiring device when: the map updated request information contains the locality information but does not contain the facility type information and the road information; and the updated contents information is contents indicating that a locality corresponding to the predetermined locality of the locality information has been changed, and the updated map information is distributed to the map acquiring device when: the map updated request information contains the road information but does not contain the facility type information and the locality information; and the updated contents information is contents indicating that at least one of a road corresponding to the predetermined road of the road information and a vicinity of the road has been changed.

13. A map acquiring method, comprising:

storing map information in a storage section;

generating map update request information that specifies contents of the map information to be updated;

transmitting the map update request information to a map distributing device that distributes updated map information related to updated contents of the map information;

acquiring the updated map information having updated contents corresponding to the contents of the map update request information from the map distributing device by a map acquiring device; and storing the map information after rewriting the map information with the updated map information, wherein the map update request information contains any one of: facility type information indicating a type of a predetermined facility of the map information; locality information indicating a predetermined locality of the map information; and road information indicating a predetermined road of the map information, the updated map information is acquired by the map acquiring device when: the map update request contains the facility type information but does not contain the locality information and the road information; and the updated contents information is contents indicating that a facility corresponding to the predetermined facility of the facility type information has been changed, the updated map information is acquired by the map acquiring device when: the map updated request information contains the locality information but does not contain the facility type information and the road information; and the updated contents information is contents indicating that a locality corresponding to the predetermined locality of the locality information has been changed, and the updated map information is acquired by the map acquiring device when: the map updated request information contains the road information but does not contain the facility type information and the locality information; and the updated contents information is contents indicating that at least one of a road corresponding to the predetermined road of the road information and a vicinity of the road has been changed.

14. A map processing program instructing a computing unit to function as a map distributing device, wherein the map distributing device includes:

a storage section that stores map information;

a map recognizer that recognizes updated map information for updating the map information, an updated contents information recognizer that compares the map information with the updated map information to recognize updated contents information that is updated contents of the updated map information;

a map update request acquirer that acquires map update request information that specifies contents of the map information to be updated from a map acquiring device in which the map information is beforehand stored; and a map distributor that compares the updated contents information with the map update request information, and distributes the updated map information to the map acquiring device when the updated contents information corresponds to the contents specified by the map update request information, the map update request information contains any one of: facility type information indicating a type of a predetermined facility of the map information; locality information indicating a predetermined locality of the map information; and road information indicating a predetermined road of the map information, the map distributor distributes the updated map information to the map acquiring device when: the map update request information contains the facility type information but does not contain the locality information and the road information; and the updated contents information is contents indicating that a facility corresponding to the predetermined facility of the facility type information has been changed, the map distributor distributes the updated map information to the map acquiring device when: the map updated request information contains the locality information but does not contain the facility type information and the road information; and the updated contents information is contents indicating that a locality corresponding to the predetermined locality of the locality information has been changed, and the map distributor distributes that updated map information to the map acquiring device when: the map updated request information contains the road information but does not contain the facility type information and the locality information; and the updated contents information is contents indicating that at least one of a road corresponding to the predetermined road of the road information and a vicinity of the road has been changed.

15. A map processing program instructing a computing unit to function as a map acquiring device, wherein
the map acquiring device includes:
a storage section that stores map information;
a map update request information generator that generates map update request information that specifies contents of the map information to be updated;
a map acquirer that transmits the map update request information to a map distributing device for distributing updated map information for updating the map information, and acquires the updated map information having the updated contents corresponding to the contents of the map update request information from the map distributing device; and
a map storing processor that rewrites the map information with the updated map information and stores the updated map information,
the map update request information contains any one of: facility type information indicating a type of a predetermined facility of the map information; locality information indicating a predetermined locality of the map information; and road information indicating a predetermined road of the map information, and
the map acquirer acquires the updated map information to the map acquiring device when: the map update request information contains the facility type information; and the updated contents of the updated map information is contents indicating that a facility corresponding to the predetermined facility of the facility type information has been changed.

16. A map processing program instructing a computing unit to perform a map distributing method, wherein
the map distributing method includes:
storing map information in a storage section;
recognizing the map information and updated map information for updating the map information;
comparing the map information with the updated map information to recognize updated contents information that is updated contents of the updated map information;
acquiring map update request information that specifies contents of the map information to be updated from a map acquiring device in which the map information is beforehand stored; and
comparing the updated contents information with the map update request information to distribute the updated map information to the map acquiring device when the updated contents information corresponds to the contents specified by the map update request information;

the map update request information one of: facility type information indicating a type of a predetermined facility of the map information; locality information indicating a predetermined locality of the map information; and road information indicating a predetermined road of the map information, the updated map information is distributed to the map acquiring device when: the map update request contains the facility type information but does not contain the locality information and the road information; and the updated contents information is contents indicating that a facility corresponding to the predetermined facility of the facility type information has been changed, the updated map information is distributed to the map acquiring device when: the map updated request information contains the locality information but does not contain the facility type information and the road information; and the updated contents information is contents indicating that a locality corresponding to the predetermined locality of the locality information has been changed, and the updated map information is distributed to the map acquiring device when: the map updated request information contains the road information but does not contain the facility type information and the locality information; and the updated contents information is contents indicating that at least one of a road corresponding to the predetermined road of the road information and a vicinity of the road has been changed.

17. A map processing program instructing a computing unit to perform a map acquiring method, wherein
the map acquiring method includes:
storing map information in a storage section;
generating map update request information that specifies contents of the map information to be updated;
transmitting the map update request information to a map distributing device that distributes updated map information related to updated contents of the map information;
acquiring the updated map information having updated contents corresponding to the contents of the map update request information from the map distributing device; and
storing the map information after rewriting the map information with the updated map information,
the map update request information contains any one of: facility type information indicating a type of a predetermined facility of the map information; locality information indicating a predetermined locality of the map information; and road information indicating a predetermined road of the map information,
the updated map information is acquired by the map acquiring device when: the map update request contains the facility type information but does not contain the locality information and the road information; and the updated contents information is contents indicating that a facility corresponding to the predetermined facility of the facility type information has been changed,
the updated map information is acquired by the map acquiring device when: the map updated request information contains the locality information but does not contain the facility type information and the road information; and the updated contents information is contents indicating that a locality corresponding to the predetermined locality of the locality information has been changed, and the updated map information is acquired by the map acquiring device when: the map updated request information contains the road information but does not contain the facility type information and the locality information; and the updated contents information is contents indicating that at least one of a road corresponding to the predetermined road of the road information and a vicinity of the road has been changed.

18. A recording medium readably storing a map processing program, wherein the map processing program instructs a computing unit to function as a map distributing device, the map distributing device includes:

a storage section that stores map information;

a map recognizer that recognizes updated map information for updating the map information;

an updated contents information recognizer that compares the map information with the updated map information to recognize updated contents information that is updated contents of the updated map information;

a map update request acquirer that acquires map update request information that specifies contents of the map information to be updated from a map acquiring device in which the map information is beforehand stored; and a map distributor that compares the updated contents information with the map update request information, and distributes the updated map information to the map acquiring device when the updated contents information corresponds to the contents specified by the map update request information, the map update request information contains any one of: facility type information indicating a type of a predetermined facility of the map information; locality information indicating a predetermined locality of the map information; and road information indicating a predetermined road of the map information, the map distributor distributes the updated map information to the map acquiring device when: the map update request information contains the facility type information but does not contain the locality information and the road information; and the updated contents information is contents indicating that a facility corresponding to the predetermined facility of the facility type information has been changed, the map distributor distributes the updated map information to the map acquiring device when: the map updated request information contains the locality information but does not contain the facility type information and the road information; and the updated contents information is contents indicating that a locality corresponding to the predetermined locality of the locality information has been changed, and the map distributor distributes that updated map information to the map acquiring device when: the map updated request information contains the road information but does not contain the facility type information and the locality information; and the updated contents information is contents indicating that at least one of a road corresponding to the predetermined road of the road information and a vicinity of the road has been changed.

19. A recording medium readably storing a map processing program, wherein the map processing program instructs a computing unit to function as a map acquiring device, the map acquiring device includes:

a storage section that stores map information;

a map update request information generator that generates map update request information that specifies contents of the map information to be updated;

a map acquirer that transmits the map update request information to a map distributing device for distributing updated map information for updating the map information, and acquires the updated map information having the updated contents corresponding to the contents of the map update request information from the map distributing device; and a map storing processor that rewrites the map information with the updated map information and stores the updated map information, the map update request information contains any one of: facility type information indicating a type of a predetermined facility of the map information; locality information indicating a predetermined locality of the map information; and road information indicating a predetermined road of the map information, the map acquirer acquires the updated map information reflecting a change in a facility when: the map update request information contains the facility type information; and the updated contents of the updated map information is contents indicating that the facility corresponding to the predetermined facility of the facility type information has been changed;

the map acquirer acquires the updated map information when: the map updated request information contains the locality information but does not contain the facility type information and the road information; and the updated contents information is contents indicating that a locality corresponding to the predetermined locality of the locality information has been changed, and the map acquirer acquires that updated map information when: the map updated request information contains the road information but does not contain the facility type information and the locality information; and the updated contents information is contents indicating that at least one of a road corresponding to the predetermined road of the road information and a vicinity of the road has been changed.

* * * * *